(12) United States Patent
Inazumi

(10) Patent No.: US 8,526,668 B2
(45) Date of Patent: Sep. 3, 2013

(54) MARKER PROCESSING METHOD, MARKER PROCESSING DEVICE, MARKER, OBJECT HAVING A MARKER, AND MARKER PROCESSING PROGRAM

(75) Inventor: Mitsuhiro Inazumi, Shiojiri (JP)

(73) Assignee: Seiko Epson Corporation (JP)

( * ) Notice: Subject to any disclaimer, the term of this patent is extended or adjusted under 35 U.S.C. 154(b) by 427 days.

(21) Appl. No.: 12/833,250

(22) Filed: Jul. 9, 2010

(65) Prior Publication Data

US 2011/0026762 A1 Feb. 3, 2011

(30) Foreign Application Priority Data

Jul. 31, 2009 (JP) .................................. 2009-179265
Mar. 19, 2010 (JP) .................................. 2010-064322
Jun. 30, 2010 (JP) .................................. 2010-149715

(51) Int. Cl.
G06K 9/00 (2006.01)
G06K 9/32 (2006.01)
G06K 19/06 (2006.01)
G06K 7/10 (2006.01)

(52) U.S. Cl.
USPC ....... 382/100; 382/294; 235/494; 235/462.33

(58) Field of Classification Search
USPC ................. 382/100, 139–140, 294; 235/456, 235/454, 494, 460, 470, 465, 566, 462.33
See application file for complete search history.

(56) References Cited

U.S. PATENT DOCUMENTS

| | | | | |
|---|---|---|---|---|
| 5,726,435 | A * | 3/1998 | Hara et al. ..................... | 235/494 |
| 7,051,937 | B2 * | 5/2006 | Albertelli et al. ......... | 235/462.25 |
| 7,946,491 | B2 * | 5/2011 | Burian et al. ............. | 235/462.07 |
| 2003/0218069 | A1 * | 11/2003 | Meier et al. .............. | 235/462.25 |
| 2007/0095916 | A1 * | 5/2007 | Joseph et al. ................. | 235/454 |
| 2010/0294840 | A1 * | 11/2010 | Barry ....................... | 235/462.01 |
| 2011/0135160 | A1 * | 6/2011 | Sagan et al. .................. | 382/108 |

FOREIGN PATENT DOCUMENTS

| | | |
|---|---|---|
| JP | 07-254037 | 10/1995 |
| JP | 2005-309717 | 11/2005 |

* cited by examiner

*Primary Examiner* — Andrae S Allison
(74) *Attorney, Agent, or Firm* — Harness, Dickey & Pierce, P.L.C.

(57) ABSTRACT

A marker processing method includes: (a) binarizing a shot image; (b) labeling one or more constituents of the image detected based on the image binarized in step (a); (c) obtaining a region centroid of each of the constituents corresponding to the respective labels processed in step (b); (d) obtaining a degree of overlap of the region centroids of the constituents corresponding respectively to the labels, obtained in step (c); and (e) detecting a marker based on the degree of overlap of the region centroids obtained in step (d).

4 Claims, 21 Drawing Sheets

| LABEL NUMBER | COORDINATE OF CENTROID |
|---|---|
| 0 | (X0, Y0) |
| 1 | (X1, Y1) |
| 2 | (X2, Y2) |
| ⋮ | ⋮ |
| N | (XN, YN) |

| MARKER MULTIPLICITY | X COORDINATE OF MARKER | Y COORDINATE OF MARKER | VARIABLE-LENGTH REGION INFORMATION (E.G., LABEL NUMBER DESCRIBED ABOVE) | | | | |
|---|---|---|---|---|---|---|---|
| 3 | X0 | Y0 | L1 | L2 | L3 | | |
| 5 | X1 | Y1 | L1 | L2 | L3 | L4 | L5 |
| 4 | X2 | Y2 | L1 | L2 | L3 | L4 | |
| ⋮ | ⋮ | ⋮ | | | | | |
| 3 | XN | YN | L1 | L2 | L3 | | |

| LABEL NUMBER | COORDINATE OF CENTROID | | MULTIPLICITY OF CENTROID |
|---|---|---|---|
| | X COORDINATE | Y COORDINATE | |
| L 1 | X 1 | Y 1 | 2 |
| L 2 | X 1 | Y 1 | 2 |

(a)

(b)

(c)

(d)

(e)

(f)

(a)

(b)

(c)

(d)

| LABEL NUMBER | COORDINATE OF CENTROID | AREA | LARGEST X COORDINATE | LARGEST Y COORDINATE | SMALLEST X COORDINATE | SMALLEST Y COORDINATE |
|---|---|---|---|---|---|---|
| 0 | (X0, Y0) | A0 | GX0 | GY0 | LX0 | LY0 |
| 1 | (X1, Y1) | A1 | GX1 | GY1 | LX1 | LY1 |
| 2 | (X2, Y2) | A2 | GX2 | GY2 | LX2 | LY2 |
| ⋮ | ⋮ | ⋮ | ⋮ | ⋮ | ⋮ | ⋮ |
| N | (XN, YN) | AN | GXN | GYN | LXN | LYN |

EXAMPLES OF MARKER WITH MULTIPLICITY OF 3

(a)　　　　　(b)　　　　　(c)　　　　　(d)

EXAMPLES OF MARKER WITH MULTIPLICITY OF 4

(e)　　　　　(f)　　　　　(g)　　　　　(h)

EXAMPLES OF MARKER WITH MULTIPLICITY OF 5

(i)　　　　　(j)　　　　　(k)　　　　　(l)

REGION WHERE ARBITRARY DATA CAN BE PLACED (MULTIPLICITY: 3)

(a)

(b)

REGION WHERE ARBITRARY DATA CAN BE PLACED (MULTIPLICITY: 3)

(c)

(d)

REGION WHERE ARBITRARY DATA CAN BE PLACED (MULTIPLICITY: 4)

(e)

(a)

(b)

MARKER PROCESSING METHOD, MARKER PROCESSING DEVICE, MARKER, OBJECT HAVING A MARKER, AND MARKER PROCESSING PROGRAM

BACKGROUND

1. Technical Field

The present invention relates to a marker processing method, a marker processing device, a marker, an object having a marker, and a marker processing program.

2. Related Art

As a method of detecting a marker out of an image obtained by shooting an object attached with the marker there are known a method of detecting a symmetrical property of the shape and a method of detecting a combination of colors.

As a method of detecting a symmetrical property of a shape, there is proposed a method of detecting a two-dimensional code having a positioning symbol. The positioning symbol is disposed at a predetermined position, and the location and the rotational angle of the two-dimensional code can be obtained using the positioning symbol detected in the image thus shot (see, e.g., JP-A-7-254037 (Document 1)).

As a method of detecting a combination of colors, there is proposed a method of detecting a hue region entirely surrounded by a different hue region as a marker. The two hue regions used as a marker are previously provided with an identification number for each combination of colors. Therefore, a hue image is extracted from the shot image, and then a variation pattern in the hue is searched by scanning from the hue image thus extracted. By detecting the region, which can be expected to be the marker, using the hue search described above, and then determining whether or not the variation pattern of the hue thus detected matches the predetermined combination, the marker is detected (see, e.g., JP-A-2005-309717 (Document 2)).

However, according to the method of detecting the symmetrical property of the shape using the technology described above, since the positioning symbol, in which a ratio of dark and bright periods is set as dark:bright:dark:bright:dark=1:1:3:1:1 as shown in FIG. 2, is detected by scanning, there arises a problem that the detectable range of the symbol, which is rotated or tilted, becomes narrower depending on the scanning interval. Further, since a high symmetrical property is required for the marker itself in order to cope with the cases in which the scanning line for detecting the marker traverses the marker in various directions, which problematically causes restriction on creating a number of markers. Further, since it is only required that the dark and bright periods have the ratio of 1:1:3:1:1, and there is basically no limitation on the absolute periods, there arises a problem that the marker detection side is required to cope with the period variation due to the size of the marker. Further, since the black/white inversion period is used as the marker, determination of the period becomes difficult when noise is mixed into the input image. Therefore, there arises a problem that some measure against the noise becomes necessary.

In other words, the technology of the Document 1 has a problem that the marker detection depends on the posture (position, rotation, or tilt) of the marker, depends on the size of the marker, and is further influenced significantly by the noise in the image.

Further, in the method of detecting a color combination according to the technology described above, it is required to perform the data processing with an amount roughly three times as large as that in the case of using a monochrome image. Therefore, there arises a problem that it is required to reduce the resolution of the image or to reduce the frame rate when capturing the image in order for achieving the amount of processing equivalent to that in the monochrome image. Further, since the hue information in the shot image is significantly influenced by illumination conditions and so on, and is further influenced significantly by the white balance and so on of the camera used for shooting, there arises a problem that some countermeasures against these factors become necessary. Further, since the pigment or the color material in the material constituting the marker to be used varies across the ages, there arises a problem that some countermeasures against the aging become necessary.

SUMMARY

An advantage of some aspects of the invention is to provide a marker processing method, a marker processing device, and a marker each independent of the posture (position, rotation, or tilt) of the marker, independent of the size of the marker, resistant to the noise in the image, and capable of reducing the amount of processing for detecting the marker using the monochrome image instead of the hue information.

A marker processing method according to an aspect of the invention includes the steps of (a) binarizing a shot image, (b) labeling one or more constituents of the image detected based on the image binarized in step (a), (c) obtaining a region centroid of each of the constituents corresponding to the respective labels processed in step (b), (d) obtaining a degree of overlap of the region centroids of the constituents corresponding respectively to the labels, obtained in step (c), and (e) detecting a marker based on the degree of overlap of the region centroids obtained in step (d).

It should be noted that the constituent of the image denotes a point, a line, or a figure included in the shot image and having the area, the region centroid denotes the centroid (the center of figure can also be adopted) of the labeled figure, and the degree of overlap of the region centroids denotes the number of labeled regions having the centroids (the center of figure can also be adopted) of falling within a predetermined range.

Further, according to another aspect of the invention, in the marker processing method of the aspect of the invention described above, there is further provided the step of (f) identifying a type of the marker detected in step (e) using at least one of the degree of overlap of the region centroids obtained in step (d), an area ratio between the regions of the marker, and a ratio of a size between the regions of the marker.

It should be noted that the marker determination process corresponds to recognizing which is the marker in the shot image, and the marker identification process corresponds to identifying the type of the marker in the shot image.

Further, according to still another aspect of the invention, in the marker processing method of the aspect of the invention described above, in step (e), the marker is detected if the degree of overlap of the region centroids is one of equal to and larger than 3.

Further, according to yet another aspect of the invention, in the marker processing method of the aspect of the invention described above, the marker includes at least three figures having a common centroid.

Further, according to still yet another aspect of the invention, there is provided a marker processing device including a binarization section adapted to binarize a shot image, a labeling section adapted to detect one or more constituents of the image based on the image binarized by the binarization section, and label the constituents detected, a region centroid obtaining section adapted to obtain a region centroid of each of the constituents corresponding to the respective labels processed by the labeling section, a region centroid multiplicity obtaining section adapted to obtain a degree of overlap of the region centroids of the constituents corresponding respectively to the labels, obtained in the region centroid obtaining section, and a marker determination section adapted to detect a marker based on the degree of overlap of the region centroids obtained in the region centroid multiplicity obtaining section.

Further, according to further another aspect of the invention, there is provided a marker including at least three figures having a common centroid.

Here, having a common centroid denotes that the centroids of the figures fall within a predetermined range.

Further, according to a further aspect of the invention, in the marker of the aspect of the invention described above, additional information is further provided.

It should be noted that the marker provided with additional information denotes the marker embedded with redundant data generated by the typical two-dimensional code generation method by superimposing the redundant data on the marker.

Further, according to a still further aspect of the invention, in the marker of the aspect of the invention described above, the additional information is digital data.

Further, according to a yet further aspect of the invention, there is provided an article of manufacture having the marker of the aspect of the invention described above.

According to a furthermore aspect of the invention, there is provided a marker processing program adapted to allow a computer to execute a process according to an aspect of the invention, the process including the steps of (a) binarizing a shot image, (b) labeling one or more constituents of the image detected based on the image binarized in step (a), (c) obtaining a region centroid of each of the constituents corresponding to the respective labels processed in step (b), (d) obtaining a degree of overlap of the region centroids of the constituents corresponding respectively to the labels, obtained in step (c), and (e) detecting a marker based on the degree of overlap of the region centroids obtained in step (d).

According to the aspects of the invention, since it is arranged that the centroid (the center of figure can also be adopted) of each of the regions labeled from the shot image is obtained, and the marker is detected based on the degree of overlap of the centroids of the regions corresponding respectively to the labels, it becomes possible to provide a marker processing method, a marker processing device, a marker, an object having the marker, and a marker processing program each of which is independent of the posture and the size of the marker, highly resistant to the noise in the image, and allowing reduction of an amount of processing for marker detection by using a monochrome image instead of hue information.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some embodiments of the invention will be explained with reference to FIGS. 1A through 29. It should be noted that the invention is not limited to the embodiments described below, but can variously be modified within the scope or the spirit of the invention.

First Embodiment

FIGS. 1A through 1D are diagrams showing some examples of a marker according to a first embodiment. In FIGS. 1A through 1D, each of the markers shown in FIGS. 1A through 1D is formed so that the centroid positions of the respective labels in each of the markers are identical to each other. Further, the markers shown in FIGS. 1A through 1D are each provided with four centroids.

Figure 1:
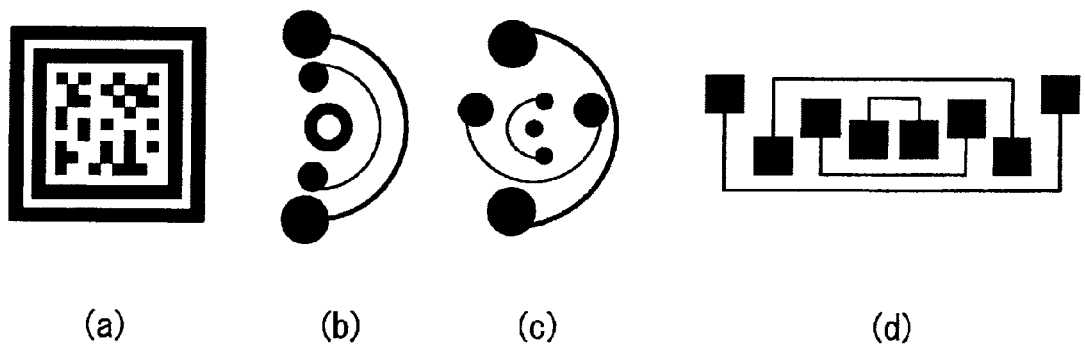
FIGS. 1A through 1D are diagrams showing some examples of the marker according to a first embodiment of the invention.
Figure 2:
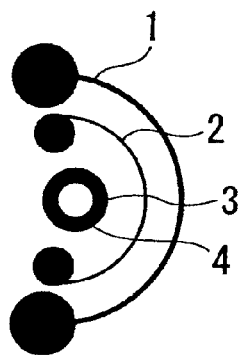
FIG. 2 is a diagram for explaining constituents of the marker shown in FIG. 1B according to the first embodiment.

FIG. 2 is a diagram for explaining constituents of the marker shown in FIG. 1B according to the first embodiment. The marker shown in FIG. 1B is constituted by a constituent 1, a constituent 2, a constituent 3 (black circle), and a constituent 4 (white circle) as constituents separated in accordance with white and black colors. These constituents are labeled in a labeling process described later for each region corresponding to the constituent.

Figure 3:
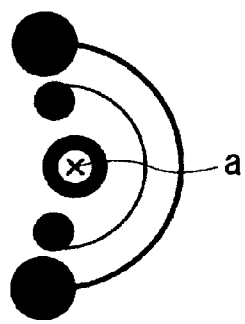
FIG. 3 is a diagram for explaining centroids of the constituents of the marker shown in FIG. 1B according to the first embodiment.

FIG. 3 is a diagram for explaining centroids of the constituents of the marker shown in FIG. 1B according to the first embodiment. The marker shown in FIG. 1B is formed having the centroids of the FIGS. 1 through 4 as the constituents overlapping with each other so as to be identical at a position indicated by the symbol a as shown in FIG. 3. It should be noted that although the centroid is indicated using a cross (x) mark for the sake of explanation, the constituents of the marker do not have the cross (x) mark in FIG. 3. In other words, the FIGS. 1 through 4 as the constituents are arranged so that the centroids thereof are common. It should be noted that the relationship between the coordinates of the centroids of the FIGS. 1 through 4 as the constituents is defined as identical even in the case in which an error within a predetermined range is provided due to the resolution of a camera used for shooting the marker, the size of the marker, or the resolution of a printer used for printing the marker. It should be noted that the centroid can be the center of figure.

Figure 4:
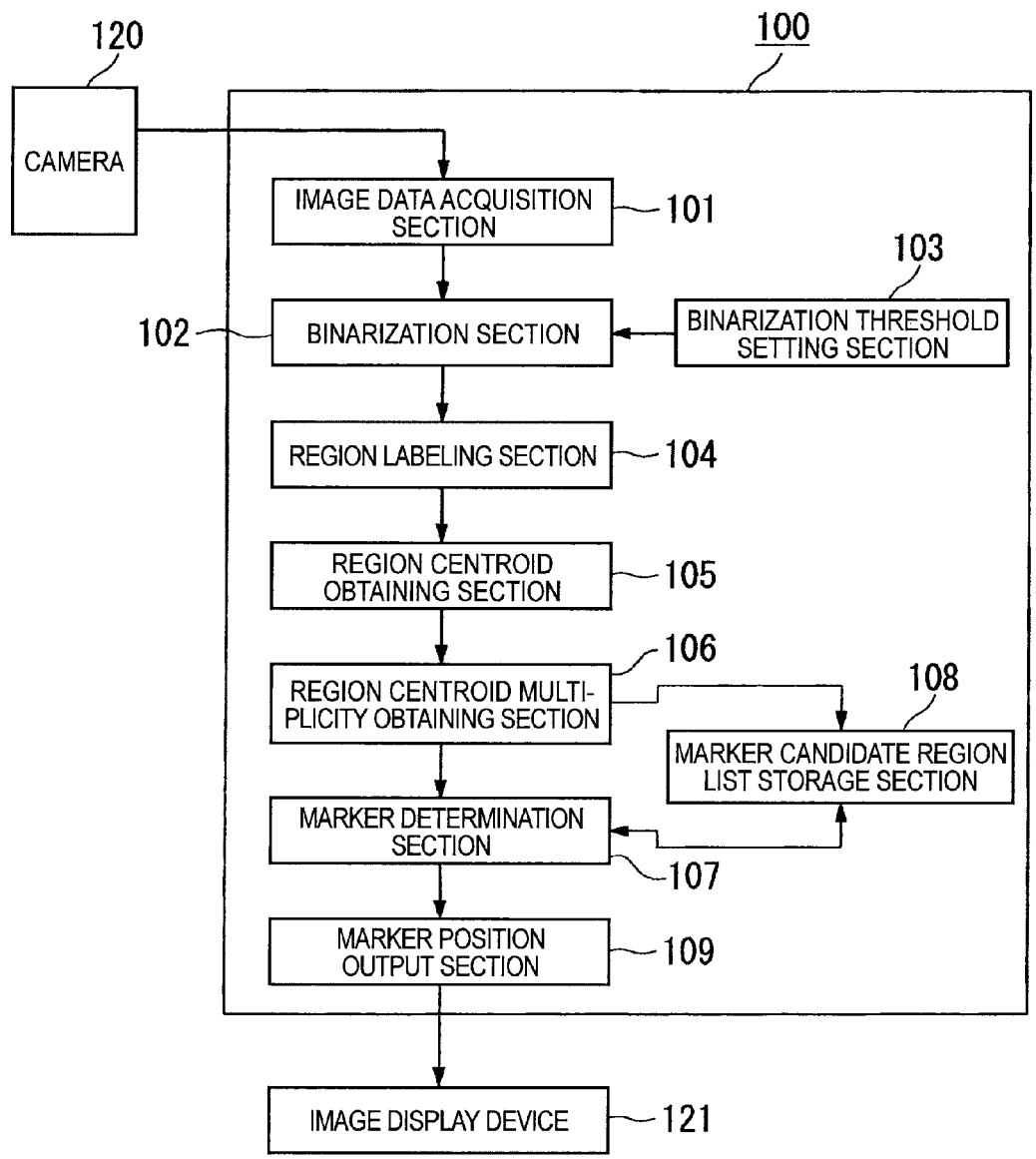
FIG. 4 is a block diagram showing an example of a configuration of a marker processing device according to the first embodiment.

FIG. 4 is a block diagram showing an example of a configuration of the marker processing device according to the first embodiment. The marker processing device 100 is composed of an image data acquisition section 101, a binarization section 102, a binarization threshold setting section 103, a region labeling section 104, a region centroid obtaining section 105, a region centroid multiplicity obtaining section 106, a marker determination section 107, a marker candidate region list storage section 108, and a marker position output section 109. Further, the marker processing device 100 receives the image shot by the camera 120. Further, the marker processing device 100 outputs the marker information detected by the processing to the image display device 121.

The camera 120 is composed, for example, of a light-receiving lens and a CCD camera, and shoots the image including the detection object attached with the marker, and then transmits the shot image to the marker processing device 100.

The image data acquisition section 101 acquires the image, which is shot by the camera 120, at a predetermined timing, and then outputs it to the binarization section 102 and the binarization threshold setting section 103. Regarding the acquisition timing of the image, it is possible to perform the acquisition every time the marker determination performed, or to acquire the image every predetermined period.

The shot image is input to the binarization section 102 from the image data acquisition section 101. Further, the binarization section 102 binarizes the image thus received using a threshold value set by the binarization threshold setting section 103, and then outputs the image information thus binarized to the region labeling section 104.

The shot image is input to the binarization threshold setting section 103 from the image data acquisition section 101. Further, the binarization threshold setting section 103 sets the threshold value used when performing the binarization on the image thus received, and then outputs the threshold value thus set to the binarization section 102.

It should be noted that as the method of setting the threshold, for example, the method proposed by Nobuyuki Otsu in 1979 (hereinafter referred to as Otsu's method) is used.

The binarized image information is input to the region labeling section 104 from the binarization section 102. Further, the region labeling section 104 performs the labeling process of the regions by a typical labeling method on the binarized image information thus received, and then outputs labeling information of the region to the region centroid obtaining section 105. According to the labeling process, the binarized image information is separated into figures constituting the image.

It should be noted that as the method of the labeling process, there can be cited a 4-neighbor process, an 8-neighbor process, and so on, which have already been known to the public, and therefore, the explanation therefor will be omitted.

Further, the labeling information of the region corresponds to the information obtained during the labeling process, such as a total number of pixels constituting the region thus labeled, the maximum value and the minimum value of the X coordinate and the maximum value and the minimum value of the Y coordinate in the region, and a label number provided to the region separated by the labeling process.

The labeling information of the region is input to the region centroid obtaining section 105 from the region labeling section 104. Further, the region centroid obtaining section 105 obtains the coordinate of the centroid for every region by a typical method using the labeling information of the region thus received, and then outputs the information of the centroid coordinate obtained to the region centroid multiplicity obtaining section 106.

The information of the centroid coordinate of each of the regions obtained from the region centroid obtaining section 105 is input to the region centroid multiplicity obtaining section 106. Further, the region centroid multiplicity obtaining section 106 compares the positions of the centroid coordinates of the respective regions using the information of the centroid coordinates of the respective regions thus received. As a result of the comparison, if the centroid coordinates thereof fall within a predetermined tolerance, the region centroid multiplicity obtaining section 106 determines that the centroids are located at the same coordinate, and obtains the multiplicity as a degree of overlap of the centroid. The multiplicity as the degree of overlap of the centroid denotes the number of centroids of a plurality of figures falling within a predetermined tolerance. For example, in the case in which a centroid A of a figure A and a centroid B of a figure B fall within a predetermined tolerance, the multiplicity is obtained as 2. Further, the tolerance for determining whether or not the centroid coordinates overlap with each other is set based on, for example, the focal length and the resolution of the camera 120 used for shooting, the centroid position accuracy in forming the marker, and the resolution of a printer for printing the marker.

The multiplicity of the centroid coordinates of the respective regions obtained from the region centroid multiplicity obtaining section 106 is input to the marker determination section 107. Further, the marker determination section 107 reads out information of a marker candidate region described later stored in the marker candidate region list storage section 108. Further, the marker information corresponds to, for example, the label number, the centroid coordinate, and the multiplicity. Further, the marker determination section 107 determines whether or not the centroid coordinate has the multiplicity equal to or greater than a predetermined multiplicity using the multiplicity of the centroid coordinates of the regions received from the region centroid multiplicity obtaining section 106 and the information of the marker candidate region read out from the marker candidate region list storage section 108. Further, in the case in which the multiplicity is equal to or higher than a predetermined value as a result of the determination, the marker determination section 107 determines it as the marker, and outputs the marker information of the region determined as the marker to the marker position output section 109. The multiplicity in the marker determination is, for example, 3 or higher.

The marker candidate region list storage section 108 stores the centroid coordinates of the region 1 and region 2, and the multiplicity thereof stored by the region centroid multiplicity obtaining section 106.

Figures 9, 10, 11:
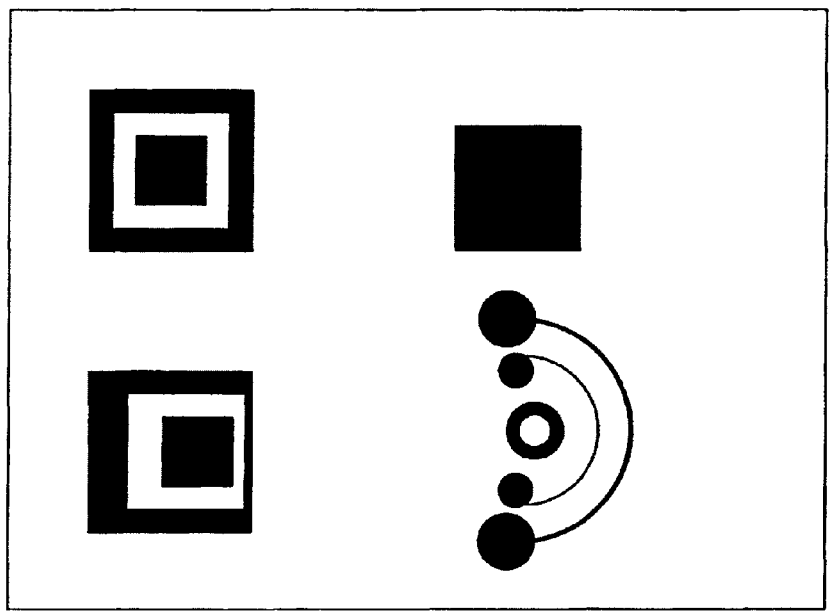
FIG. 9 is a diagram showing an example of a marker output according to the first embodiment.
FIG. 10 is a diagram showing an example of a data configuration of a marker candidate list stored in a marker candidate region list storage section 109 according to the first embodiment.
FIG. 11 is a diagram showing an example of image information obtained by binarizing an input image according to the first embodiment.

FIG. 10 is a diagram showing an example of a data configuration of a marker candidate list stored in a marker candidate region list storage section 108 according to the first embodiment. As shown in FIG. 10, the marker candidate region list is stored having the label numbers, the centroid coordinates, and the multiplicity of the centroid correlated with each other.

The marker information thus determined is input to the marker position output section 109 from the marker determination section 107, and the marker position output section 109 generates the information displayed on the image display device based on the marker information thus received, and then outputs it to the image display device 121.

FIG. 9 is a diagram showing an example of the marker information output by the marker position output section 109. As shown in FIG. 9, the marker information output by the marker position output section 109 includes the centroid coordinate of a figure determined as the marker, the multiplicity of the centroid, the label name as the information of the regions having the centroids overlapping with each other, and so on correlated with each other.

The image for displaying the marker information thus generated is input to the image display device 121 from the marker processing device 100, and the image display device 121 displays the image thus received.

Figure 5:
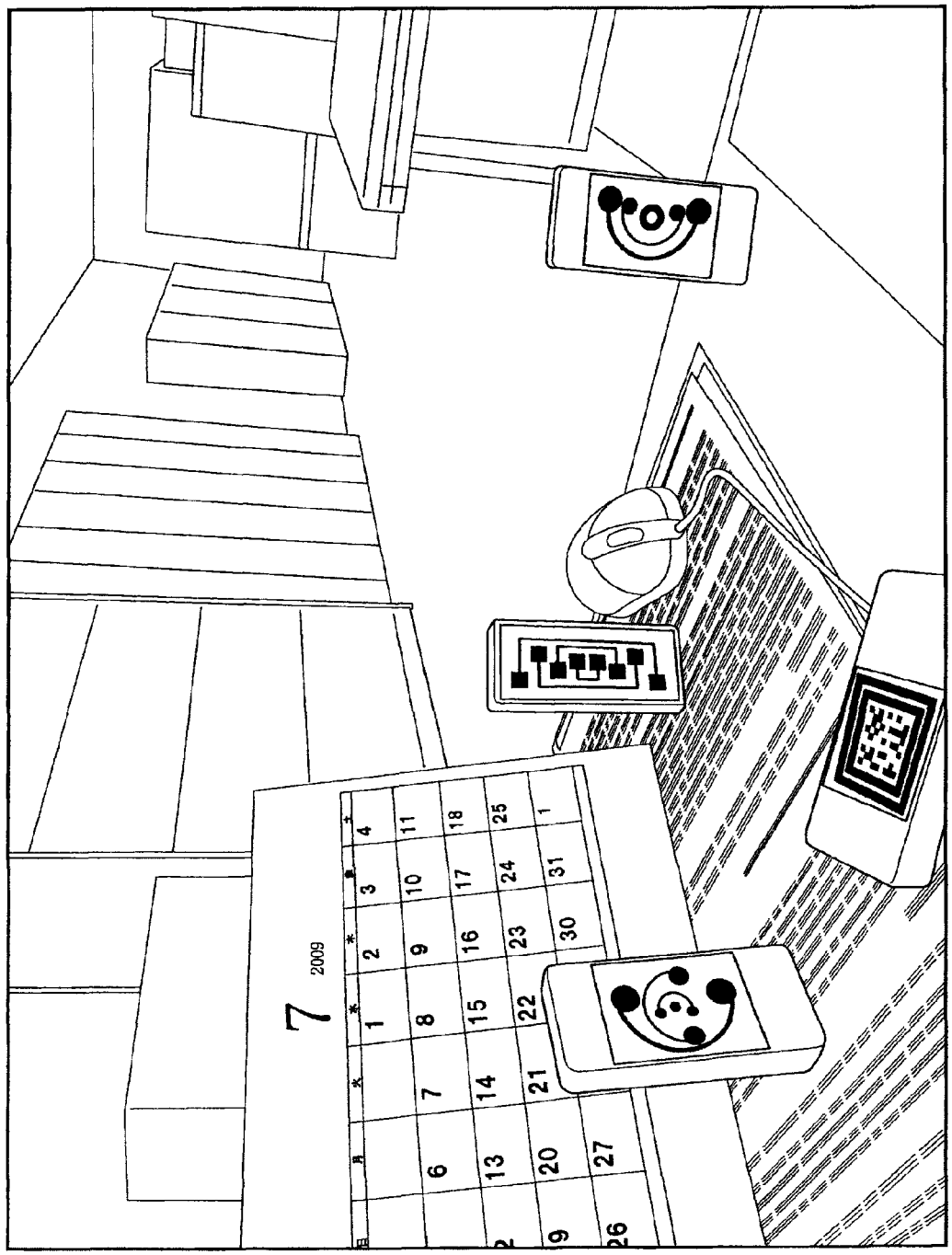
FIG. 5 is a diagram showing an example of an image including detection objects attached with the markers according to the first embodiment.

FIG. 5 is a diagram showing an example of an image including detection objects attached with the markers according to the first embodiment. In the example shown in FIG. 5, there are four detection objects, each of which is attached with either one of the markers shown in FIGS. 1A through 1D. Further, as shown in FIG. 5, the markers of the respective detection objects attached with the markers are different in position, and are disposed with rotation, magnification or reduction due to the influence of the perspective caused by the arrangement.

Figure 6:
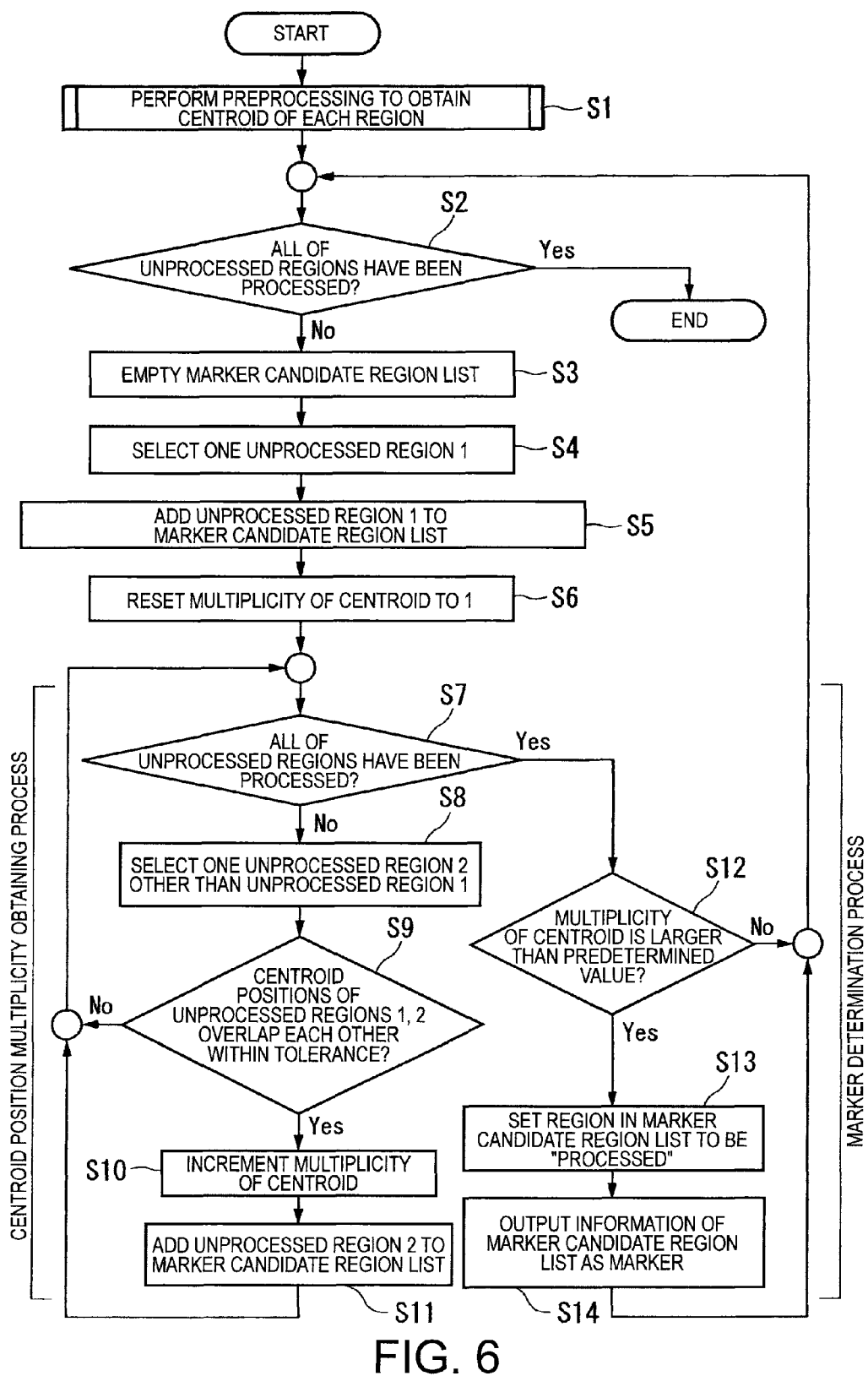
FIG. 6 is a flowchart of a processing method according to the first embodiment.
Figures 7, 8:
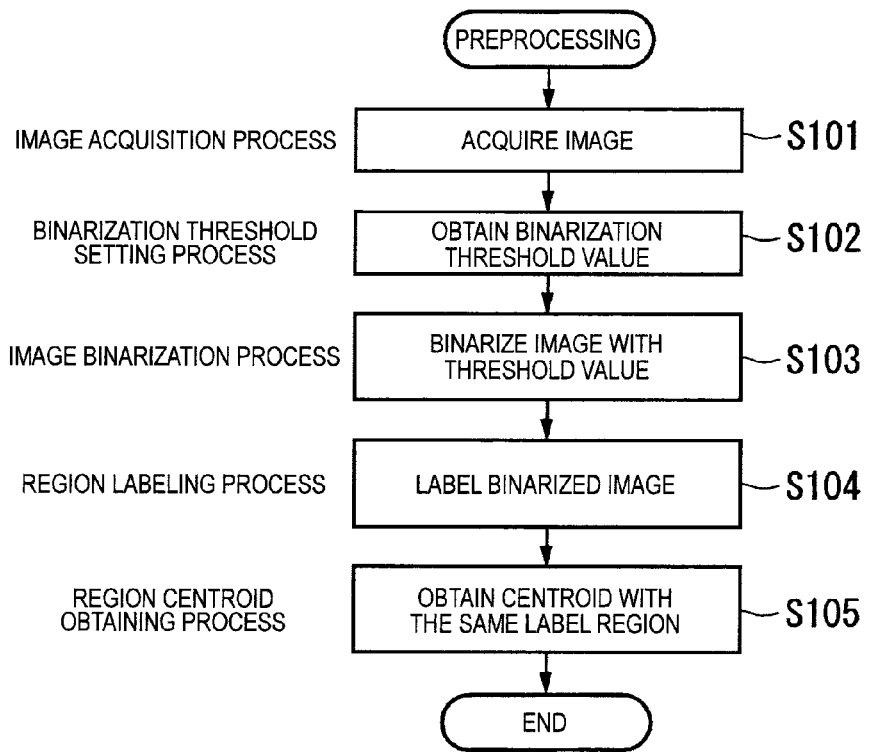
FIG. 7 is a flowchart of preprocessing according to the first embodiment.
FIG. 8 is a diagram showing an example of the data showing coordinates of the centroids of the respective labels obtained by a region centroid obtaining section according to the first embodiment.

Then, the marker processing method according to the first embodiment will be explained using the flowcharts shown in FIGS. 6 and 7, and an example of the centroid data shown in FIG. 8 obtained by a preprocessing. FIG. 6 is a flowchart of the marker processing method according to the first embodiment. FIG. 7 is a flowchart of the preprocessing in the first embodiment. FIG. 8 is a diagram showing an example of the data showing coordinates of the centroids of the respective labels obtained by the region centroid obtaining section 105. Firstly, the centroid of each of the regions is obtained (step S1) in the preprocessing.

The preprocessing in the step S1 will be explained using the flowchart shown in FIG. 7. The image acquisition section 101 obtains (an image acquisition process: step S101) the image shot by the camera 120.

The image acquisition section 101 outputs the image thus acquired to the binarization section 102 and the binarization threshold setting section 103. The binarization threshold setting section 103 obtains (a binarization threshold setting step: step S102) the threshold value for performing the binarization based on the image received from the image acquisition section 101 using, for example, the Otsu's method.

Subsequently, the binarization section 102 binarizes (an image binarization process: step S103) the image received from the image acquisition section 101 using the threshold value set by the binarization threshold setting section 103. The binarization section 102 outputs the image information thus binarized to the region labeling section 104.

Subsequently, the region labeling section 104 performs (a region labeling process: step S104) labeling of the region based on the binarized image information received from the binarization section 102. Further, the region labeling section 104 outputs the information thus labeled to the region centroid obtaining section 105.

Subsequently, the region centroid obtaining section 105 obtains (a region centroid obtaining process: step S105) the coordinate of the centroid of each of the label regions from the labeled information received from the region labeling section 104. The region centroid obtaining section 105 outputs the coordinate of the centroid of each of the label regions thus obtained to the region centroid multiplicity obtaining section 106. Then the preprocessing is terminated.

Going back to FIG. 6, the region centroid multiplicity obtaining section 106 and the marker determination section 107 determine (step S2) whether or not the processing of all of the unprocessed regions has been completed. The completion of the processing of all of the unprocessed regions is determined based on whether or not the obtaining of the multiplicity of all of the combinations of the labeled regions by the region centroid multiplicity obtaining section 106, and the marker determination of all of the combinations of the regions by the marker determination section 107 have been completed.

If it is determined in the step S2 that the processing of all of the unprocessed regions has not been completed (No in the step S2), the region centroid multiplicity obtaining section 106 deletes (step S3) the data of the list of the marker candidate regions stored in the marker candidate region list storage section 108 to empty the marker candidate region list storage section 108.

Subsequently, the region centroid multiplicity obtaining section 106 selects (step S4) one unprocessed region 1 out of the coordinates of the centroids of the respective label regions received from the region centroid obtaining section 105.

Subsequently, the multiplicity obtaining section 106 adds (step S5) the unprocessed region 1 thus selected to the list of the marker candidate region list storage section 108. In other words, the marker candidate region list denotes a list of the regions selected by the multiplicity obtaining section 106, and the candidates of the marker on which the determination of whether or not it is the marker is performed by the marker determination section 107.

Subsequently, the region centroid multiplicity obtaining section 106 resets (step S6) the multiplicity stored in the multiplicity storage section in the multiplicity obtaining section 106 to 1.

Subsequently, the region centroid multiplicity obtaining section 106 determines whether or not the processing of all of the unprocessed regions has been completed (step S7).

If it is determined in the step S7 that the processing of all of the unprocessed regions has not been completed (No in the step S7), the region centroid multiplicity obtaining section 106 selects (step S8) one unprocessed region 2 other than the unprocessed region 1 selected in the step S4.

Subsequently, the region centroid multiplicity obtaining section 106 compares the centroid coordinates of the unprocessed region 1 selected in the step S4 and the unprocessed region 2 selected in the step S8 with each other. Further, the region centroid multiplicity obtaining section 106 determines (step S9) whether or not the centroid coordinates of the unprocessed region 1 and the unprocessed region 2 overlap with each other within a predetermined tolerance as a result of the comparison of the centroid coordinates. The predetermined tolerance is a value set based on, for example, the focal length of the camera 120 used for shooting, formation accuracy in forming the marker, the resolution of the printer for printing the marker, and so on.

If it is determined in the step S9 that the centroid coordinates of the unprocessed region 1 and the unprocessed region 2 overlap with each other in the predetermined tolerance (Yes in the step S9), the region centroid multiplicity obtaining section 106 adds 1 to the multiplicity of the centroid, and then stores (step S11) it in the multiplicity storage section in the multiplicity obtaining section 106.

Further, the region centroid multiplicity obtaining section 106 stores the centroid coordinate and the multiplicity of the unprocessed region 2 into the marker candidate region list storage section 108.

Here, as shown in FIG. 10, there are stored the label numbers, the centroid coordinates, and the multiplicity of the centroid correlated with each other.

On the other hand, if it is determined in the step S9 that the centroid coordinates of the unprocessed region 1 and the unprocessed region 2 do not overlap with each other within the predetermined tolerance (No in the step S9), the region centroid multiplicity obtaining section 106 returns the process to the step S7.

It should be noted that the steps S7 through S11 correspond to a centroid position multiplicity obtaining process.

Subsequently, the marker determination section 107 determines (step S12) whether or not the multiplicity of the centroid of each of the marker candidate regions, namely the unprocessed region 1 and the unprocessed region 2, stored in the marker candidate region list storage section 108 is equal to or larger than a predetermined value, for example, 3. If it is determined in the step S12 that the multiplicity of the centroid of each of the candidate regions is equal to or larger than the predetermined value (Yes in the step S12), the marker determination section 107 sets (step S13) the combination of the unprocessed region 1 and the unprocessed region 2 to be "processed."

On the other hand, if it is determined in the step S12 that the multiplicity of the centroid of each of the candidate regions is neither equal to nor larger than the predetermined value (No in the step S12), the marker determination section 107 returns the process to the step S2.

Subsequently, the marker determination section 107 determines the marker candidate with the multiplicity of the centroid equal to or larger than the predetermined value as the marker, and then outputs (step S14) the result to the marker position output section 109.

It should be noted that the steps S12 through S14 correspond to a marker determination process.

The steps S2 through S14 are repeated to obtain the multiplicity of all of the combinations of the labeled regions, and further, whether or not the combination is the marker is determined.

The marker information determined as the marker by the marker determination section 107 is input to the marker position output section 109. Further, the marker position output section 109 generates the image information to be displayed on the image display device based on the marker information thus received, and then outputs the image information thus generated to the image display device 121.

Here, as shown in FIG. 9, the centroid coordinate determined as the marker, the multiplicity of the centroid, the label manes as the region information of the regions having the centroids overlapping with each other, and so on are output while being correlated to each other.

According to the process described above, the marker processing is terminated.

It should be noted that although the method of performing the detection of the marker every time two regions are compared with each other is hereinabove described, the method of detecting the marker is not limited thereto, but it is also possible that the multiplicity obtaining section 106 performs the comparison with respect to all of the combinations of the regions in advance, and then sequentially obtains the multiplicity using the result of the comparison. Further, it is also possible to arrange that the marker determination section 107 determines the marker after all of the multiplicity values have been obtained.

Figure 12:
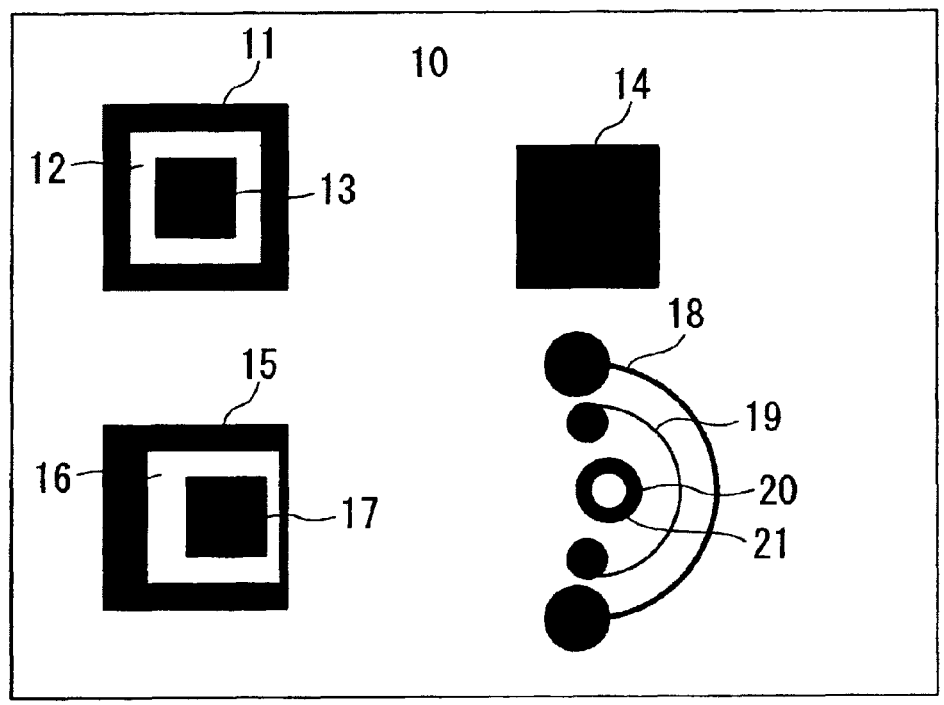
FIG. 12 is a diagram for explaining a labeling process according to the first embodiment.
Figure 13:
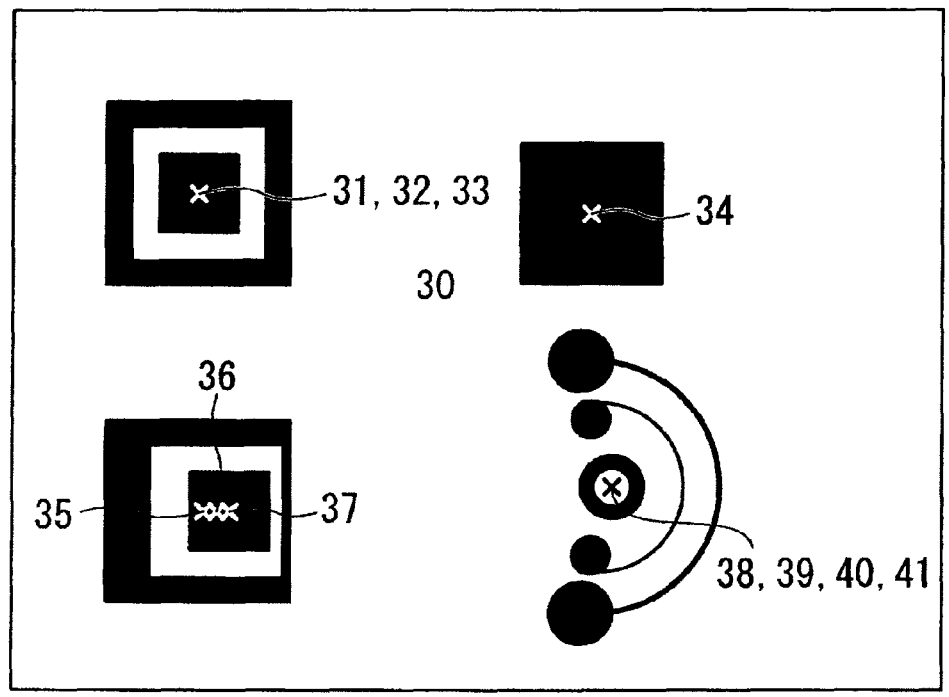
FIG. 13 is a diagram showing an example of a result of obtaining the centroids of the regions having the same label according to the first embodiment.
Figure 14:
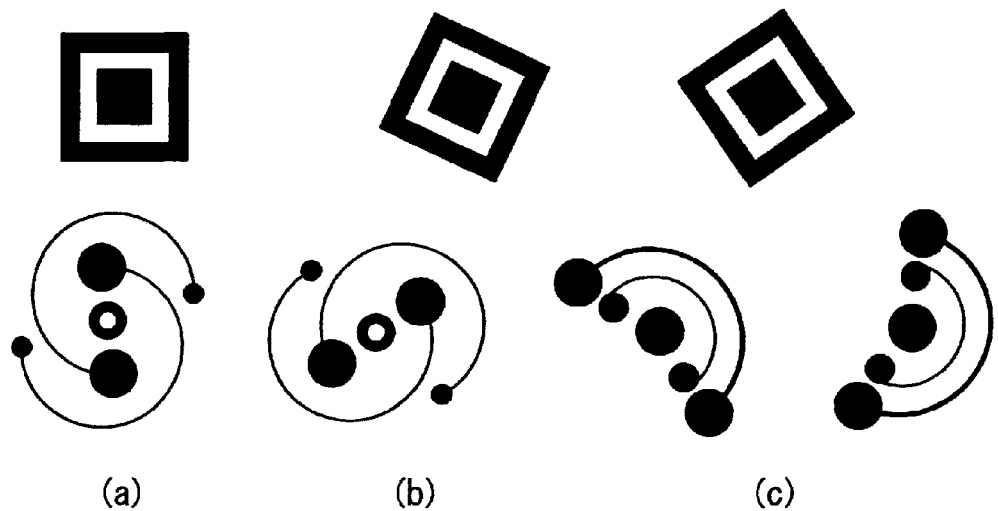
FIGS. 14A through 14C are diagrams for explaining the fact that the marker detection according to the first embodiment does not depend on the posture.
Figure 15:
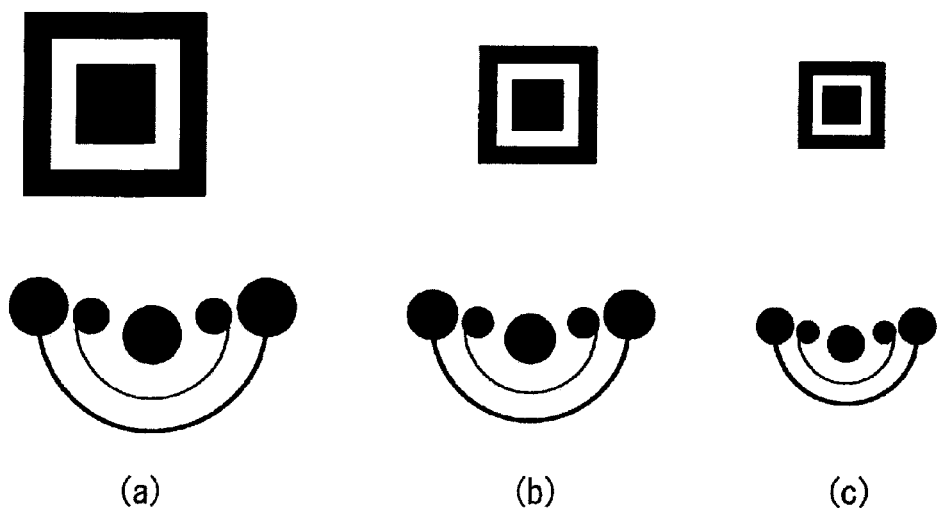
FIGS. 15A through 15C are diagrams for explaining the fact that the marker detection according to the first embodiment does not depend on the size.
Figure 16:
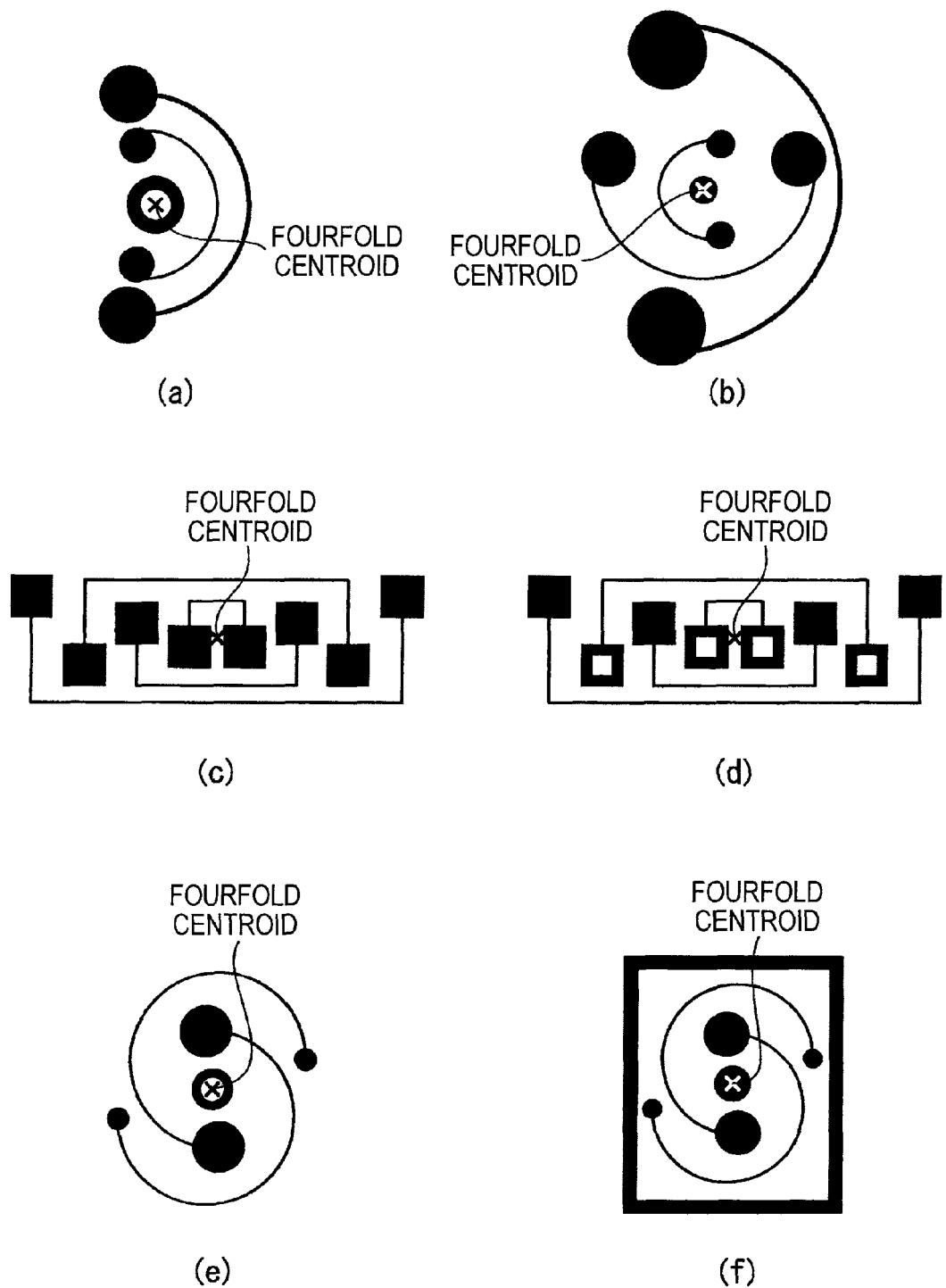
FIGS. 16A through 16F are diagrams showing examples of other markers according to the first embodiment.
Figure 17:
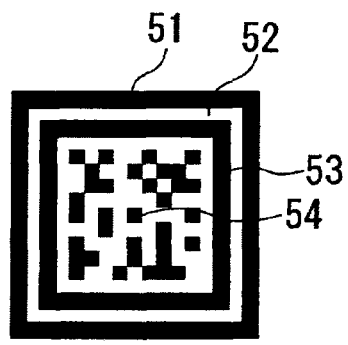
FIGS. 17A through 17F are diagrams showing examples of a marker including redundant portions according to the first embodiment.
Figure 17:
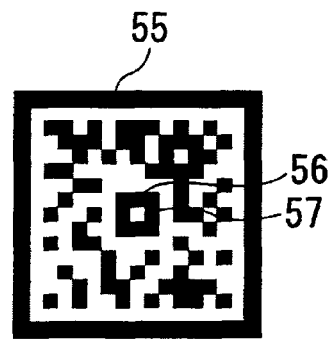
Figure 17:
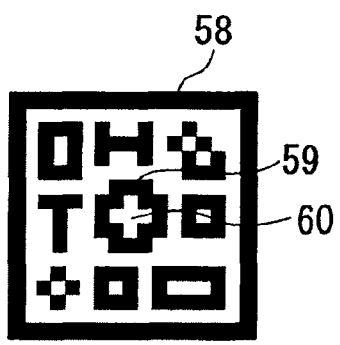
Figure 17:
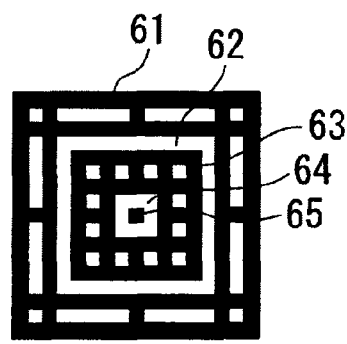
Figure 17:
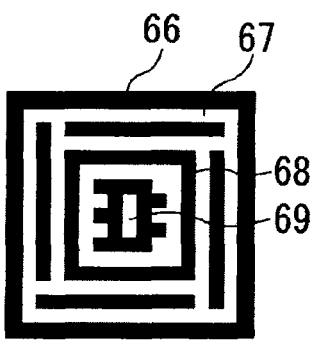
Figure 17:
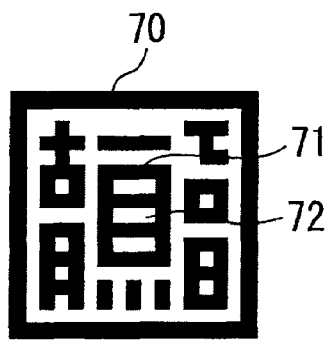
Figure 18:
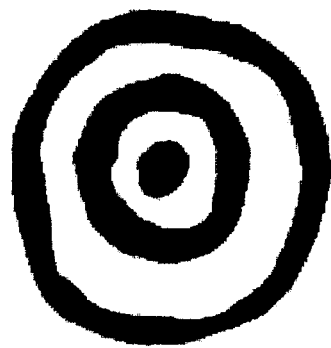
FIGS. 18A through 18D are diagrams showing examples of a handwritten marker according to the first embodiment.
Figure 18:
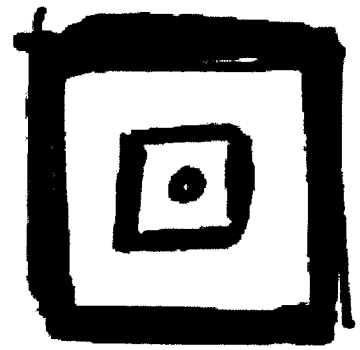
Figure 18:
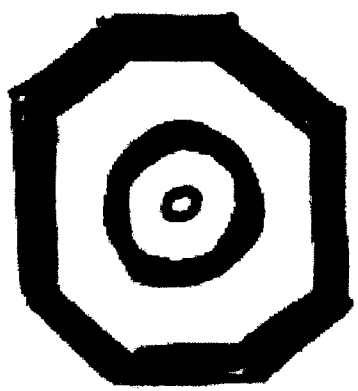
Figure 18:
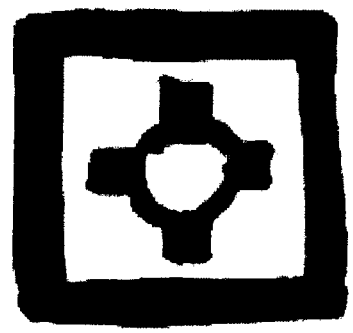

Then, a specific example of the marker process will be explained with reference to FIGS. 11 through 13. FIG. 11 is a diagram showing an example of an image obtained by binarizing the input image according to the first embodiment. FIG. 12 is a diagram for explaining the labeling process according to the first embodiment. FIG. 13 is a diagram showing an example of a result of obtaining the centroids of the regions having the same label according to the first embodiment.

The case in which the image obtained by simplifying the image shot by the camera 120 in order for explaining the marker process, and then binarizing by the binarization section 102 is as shown in FIG. 11 will be explained.

The region labeling section 104 labels the image information binarized by the binarization section 102 into constituents 10 through 21 as shown in FIG. 12. It should be noted here that the case in which the background 10 is also labeled as a constituent will be explained.

Subsequently, the region centroid obtaining section 105 obtains the centroid coordinate of each of the labels thus labeled by the region labeling section 104. As shown in FIG. 13, the centroids of the respective labels obtained by the region centroid obtaining section 105 are denoted as the reference numerals 30 through 41. In FIG. 13, the coordinate 30 corresponds to the centroid coordinate of the label 10, and the coordinate 31 corresponds to the centroid coordinate of the label 11, for example. It should be noted that each of the centroids is indicated by the cross (x) in FIG. 13.

Subsequently, the region centroid multiplicity obtaining section 106 sequentially compares the centroid coordinates obtained by the region centroid obtaining section 105 to thereby proceed with calculation of the multiplicity of the coordinate at which the centroids overlap with each other. In FIG. 13, the region centroid multiplicity obtaining section 106 proceeds with sequentially comparing the centroid coordinates 30 through 41 of the respective labels 10 through 21. In FIGS. 11 and 13, it is determined that the centroid coordinates 31 through 33 of the labels 11 through 13 overlap with each other, and the multiplicity is set to 3. Further, it is determined that the centroid coordinates 38 through 41 of the labels 18 through 21 overlap with each other, and the multiplicity is set to 4. On the other hand, each of the centroid coordinates 30, 34 through 37 of the labels 10, 14 through 17 does not have a coordinate overlapping therewith, and therefore, the multiplicity is set to 1.

Subsequently, the marker determination section 107 determines whether or not the multiplicity of the centroid of each of the marker candidate regions stored in the marker candidate region list storage section 108 is equal to or larger than a predetermined value, for example, 3. In FIG. 13, the marker determination section 107 determines the regions with the multiplicity of the centroid equal to or larger than 3, namely the two regions, one corresponding to the labels 11 through 13 (the centroids 31 through 33, the multiplicity of the centroid is 3) and the other corresponding to the labels 18 through 21 (the centroids 38 through 41, the multiplicity of the centroid is 4), as the markers. Further, the marker determination section 107 outputs the centroid coordinate (an X coordinate and a Y coordinate of the marker) of the region determined to be the marker, the multiplicity (the marker multiplicity) of the centroid, and the numbers of the labels as the constituents of the marker to the marker position output section 109 while correlating them with each other.

According to the marker process described above, the shot image is separated into the markers and the figures other than the markers. Here, in FIG. 12, the labels 11 through 13 and the labels 18 through 21 are markers, while the labels 10, 14 through 17 are figures other than the markers.

Then, the fact that the marker and the marker processing method according to the first embodiment are not influenced by the rotation or the tilt of the marker, and further by the size (magnification and reduction) of the marker will be explained with reference to FIGS. 14A through 14C and 15A through 15C. FIGS. 14A through 14C are diagrams for explaining the fact that the marker detection does not depend on the posture. FIGS. 15A through 15C are diagrams for explaining the fact that the marker detection does not depend on the size.

FIG. 14A is a diagram showing an example in which the markers have no tilt, while FIGS. 14B and 14C are diagrams showing examples in which the markers are tilted (rotated). FIGS. 15A through 15C are diagrams showing an example of the case in which the size of the marker is changed by magnification or reduction. According to the marker process of the first embodiment, since the information of a point, namely the centroid coordinate of the marker, is obtained, and the marker determination is performed based on the overlap of the centroid coordinates, even in the case in which the marker is rotated or tilted, or the marker is magnified or reduced to be changed in size as shown in FIGS. 14A through 14C, and 15A through 15C, the marker detection does not depend on the posture (position, rotation, and tilt) of the marker, or the size of the marker.

Then, examples of other markers according to the first embodiment are shown in FIGS. 16A through 16F, 17A through 17F, and 18A through 18D.

FIGS. 16A through 16F are diagrams showing other markers according to the first embodiment. FIGS. 16A through 16F are diagrams showing examples of a marker with a fourfold centroid. It should be noted that each of the centroids is indicated by the cross (x) in FIGS. 16A through 16F. As shown in FIGS. 16A through 16F, according to the marker processing method of the first embodiment, a variety of markers can be formed.

Since the only requirement of the marker and the marker process in the first embodiment is that a predetermined number of centroids of the regions (labels) of the element overlap with each other, if a redundant element is embedded in a space other than the region, substantially the same advantage can be obtained. Therefore, examples of the markers having one or more redundant elements embedded therein are shown in FIGS. 17A through 17F. FIGS. 17A through 17F are diagrams showing examples of the markers including one or more redundant portions. As shown in FIGS. 17A through 17F, FIGS. 17A and 17E show examples of a fourfold centroid, FIGS. 17B, 17C, and 17F show examples of a threefold centroid, and FIG. 17D shows an example of a fivefold centroid. Further, in FIGS. 17A through 17F, reference numerals 51 through 72 denote the regions as the constituents of the markers. For example, in FIG. 17A, the regions as the constituents are denoted by the reference numerals 51 through 54, and the centroids of the four regions overlap with each other at one point (the multiplicity is equal to 4).

Further, FIGS. 18A through 18D are diagrams showing examples of a handwritten marker. As shown in FIGS. 18A through 18D, according to the first embodiment, the marker process can be performed in a similar manner even in the case of the handwritten markers if the centroids fall within a predetermined tolerance, or by setting the tolerance of the centroid to the range, which the error of the centroids of the handwritten markers fits in.

As described above, according to the first embodiment, the binarization section 102 binarizes the shot image, the region labeling section 104 performs the labeling on the image information thus binarized, and then the region centroid obtaining section 105 obtains the centroid (the center of figure can also be adopted) of each of the regions thus labeled. Subsequently, the region centroid multiplicity obtaining section 106 compares the centroids of the regions having the respective labels thus obtained to thereby obtain the multiplicity representing how the centroids overlap with each other. Further, the marker determination section 107 performs the marker determination based on whether or not the multiplicity thus obtained is equal to or larger than a predetermined value. Therefore, it becomes possible to provide a marker independent of the posture (position, rotation, and tilt) of the marker and further the size of the marker, and to perform the marker process.

Second Embodiment

Then, a second embodiment will be explained with reference to FIGS. 19 through 21, 22A through 22L, and 23A through 23L. In the first embodiment, the marker determination is performed with respect to the regions labeled by the region labeling section 104 using the multiplicity as a degree of overlap of the centroids of the respective regions. In the second embodiment, identification of a type of the marker is further performed with respect to the regions labeled by the region labeling section 104.

Figure 19:
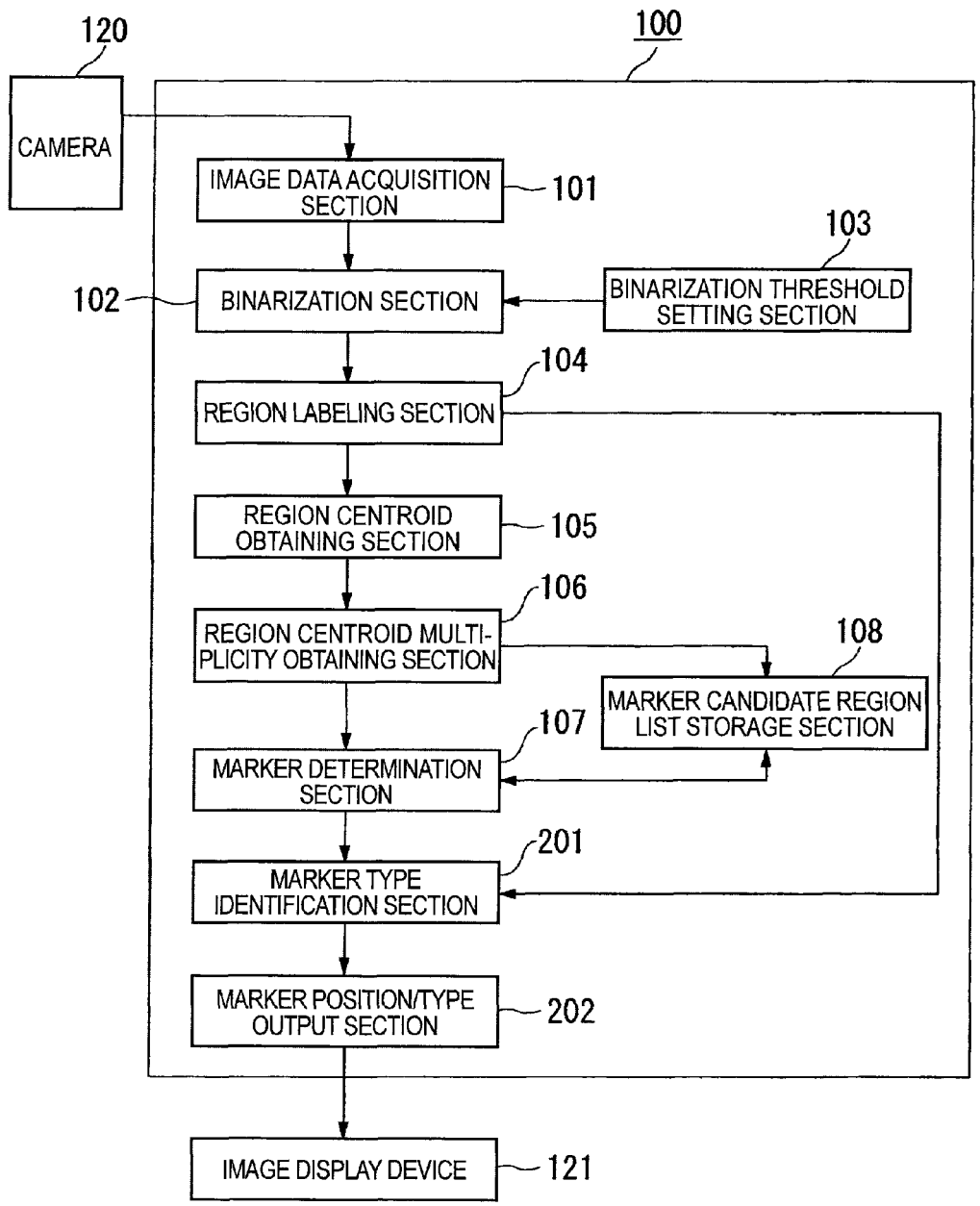
FIG. 19 is a block diagram showing an example of a configuration of a marker processing device according to a second embodiment of the invention.

FIG. 19 is a block diagram showing an example of a configuration of the marker processing device according to the second embodiment. The marker processing device 100 is composed of an image data acquisition section 101, a binarization section 102, a binarization threshold setting section 103, a region labeling section 104, a region centroid calculation section 105, a region centroid multiplicity calculation section 106, a marker determination section 107, a marker candidate region list storage section 108, a marker type identification section 201, and a marker position/type output section 202. Further, the image shot by the camera 120 is input to the marker processing device 100. Further, the marker processing device 100 outputs the marker information detected to the image display device 121. The marker processing device 100 is different from that of the first embodiment in the marker type identification section 201, and the marker position/type output section 202.

The marker type identification section 201 receives the information of each of the regions obtained in the labeling process from the region labeling section 104.

Figures 20, 21:
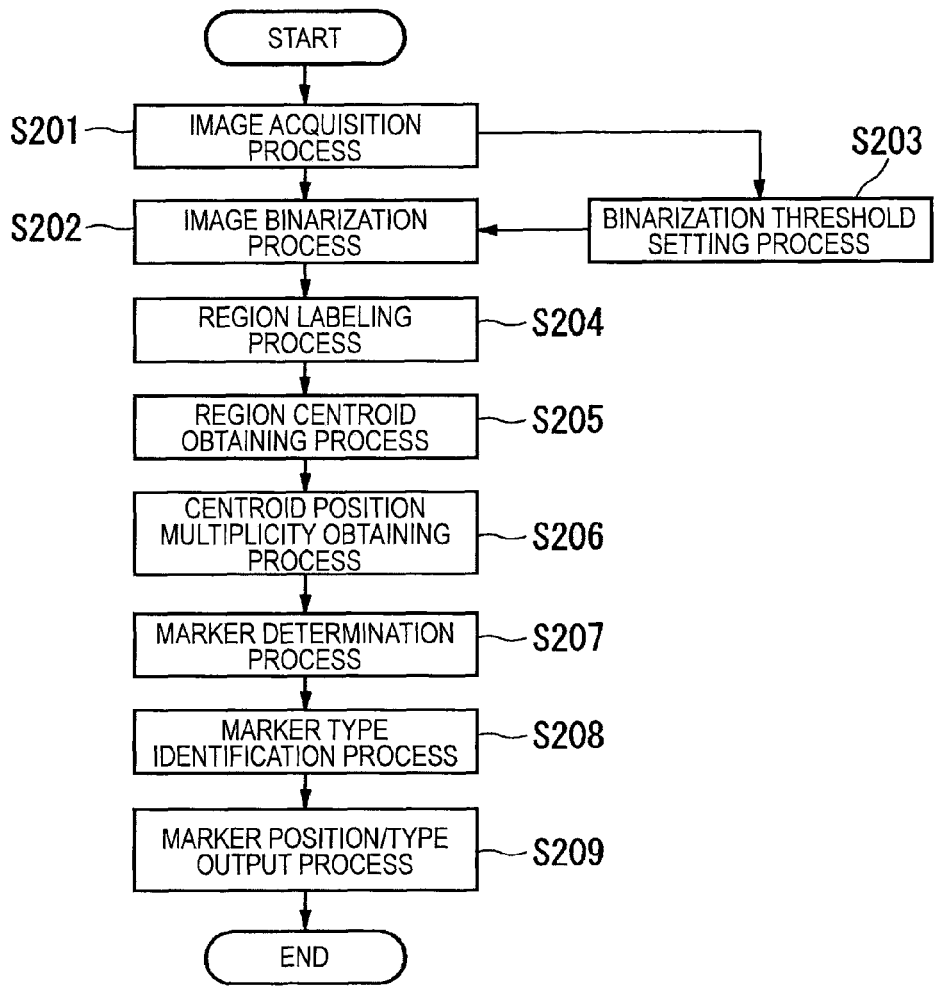
FIG. 20 is a flowchart of a processing method according to the second embodiment.
FIG. 21 is a diagram showing an example of centroid data obtained in the preprocessing according to the second embodiment.
Figure 22:
FIGS. 22A through 22L are diagrams for explaining an example of identifying the marker based on the difference in multiplicity between the markers according to the second embodiment.
Figure 22:
Figure 22:
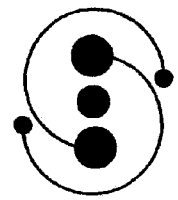
Figure 22:
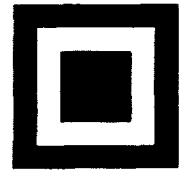
Figure 22:
Figure 22:
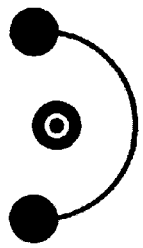
Figure 22:
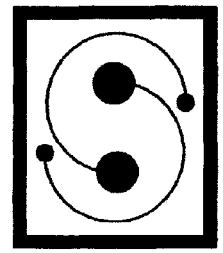
Figure 22:
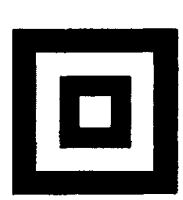
Figure 22:
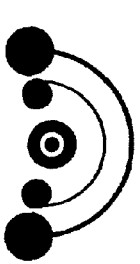
Figure 22:
Figure 22:
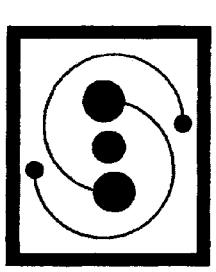
Figure 22:
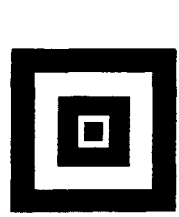
Figure 23:
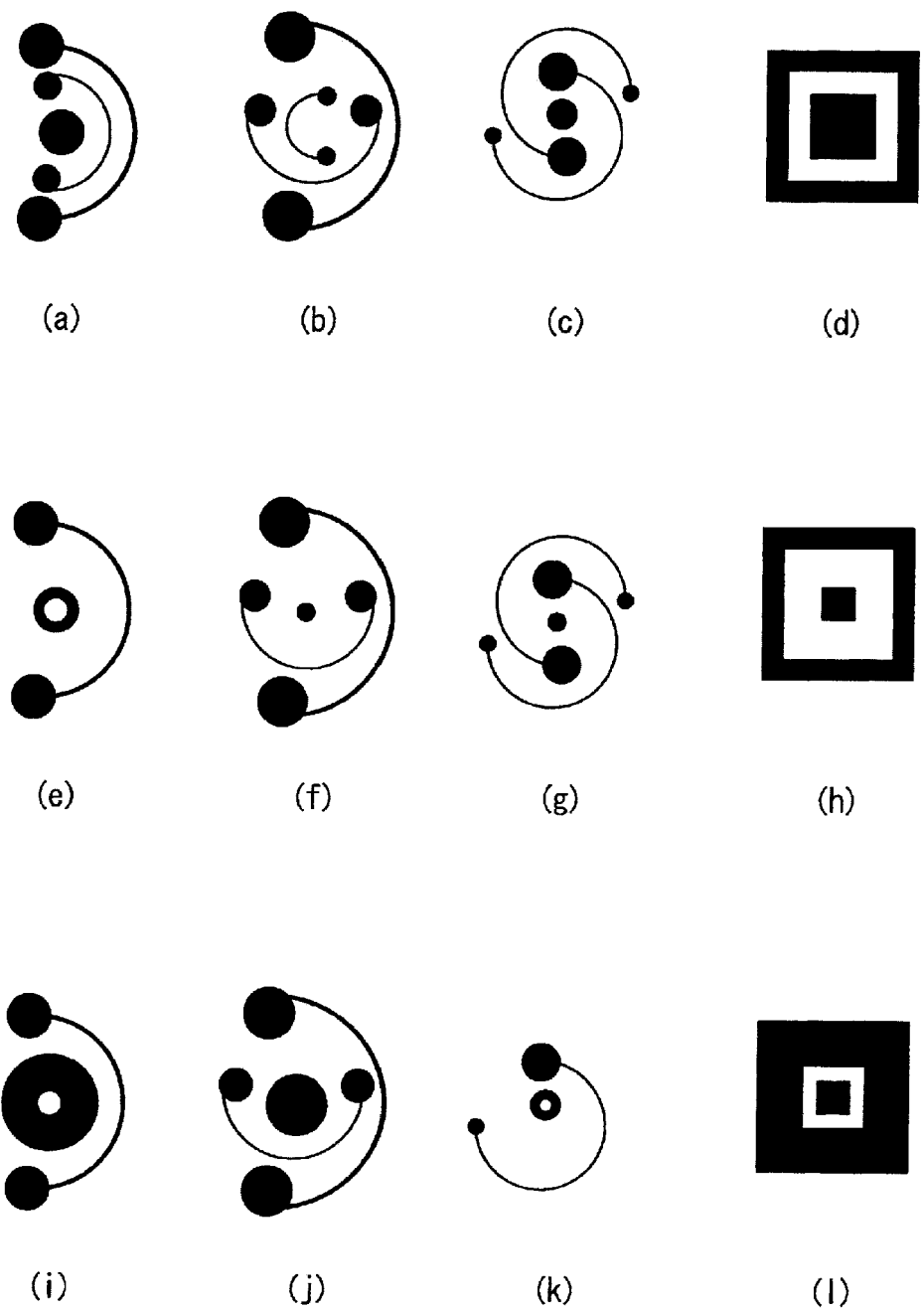
FIGS. 23A through 23L are diagrams for explaining an example of identifying the marker type using the area ratio, the ratio of the size of the region of the marker according to the second embodiment.

FIG. 21 is a diagram showing an example of the information obtained in the labeling process by the region labeling section 104. As shown in FIG. 21, due to the labeling process by the region labeling section 104, there are obtained all of the label numbers used for the labeling process, the centroid coordinate of each of the labeled regions, the area of each of the labeled regions, the largest X coordinate of each of the labeled regions, the largest Y coordinate of each of the labeled regions, the smallest X coordinate of each of the labeled regions, and the smallest Y coordinate of each of the labeled regions. It should be noted that the centroid can be the center of figure.

Further, the marker type identification section 201 performs identification of the marker based on the ratio of the size between the regions, or the ratio of the area between the regions using the region information received from the region labeling section 104. The area of the labeled region corresponds to, for example, the total number of pixels having the same label in the image thus obtained. Further, by sequentially comparing the coordinate values of each of the pixels having the same label with the largest value and the smallest value, the largest value and the smallest value of the coordinate in a certain label can be obtained. The area of the region of each label is obtained by calculation using the largest value and the smallest value of the coordinate, and the number of pixels having the same label.

The marker determination section 107 firstly performs the marker determination based on the multiplicity obtained by the region centroid multiplicity obtaining section 106.

The marker type identification section 201 identifies the type of the marker with respect to the information with which the regions are determined as the marker in the marker determination section 107 using at least one of the multiplicity of the marker, the area ratio between the regions of the marker, and the ratio of the size of the regions of the marker.

Further, the marker type identification section 201 outputs the marker information thus determined and identified to the marker position/type output section 202.

The position information of the marker, the type information of the marker, the multiplicity, the label number for constituting the marker, and so on identified by the marker type identification section 201 are input to the marker position/type output section 202, and the marker position/type output section 202 generates the information to be displayed on the image display device based on the marker information thus received, and then outputs it to the image display device 121.

FIGS. 22A through 22L are diagrams for explaining an example of identifying the marker based on the difference in multiplicity between the markers. In FIGS. 22A through 22L, FIGS. 22A through 22D show examples of the marker with the multiplicity of 3, FIGS. 22E through 22H show examples of the marker with the multiplicity of 4, and FIGS. 22I through 22L show examples of the marker with the multiplicity of 5. For example, in the case in which there are three detection objects to be identified, if the markers with the multiplicities different from each other are attached respectively, the each of the markers can be identified, and therefore, the positions of the detection objects attached with the markers and the types of the detection objects correlated with the markers in advance can also be identified. Further, even in the case in which the detection objects and the markers are not correlated with each other, it is possible to obtain the position by identifying the markers with the multiplicities different from each other based on the shot image.

FIGS. 23A through 23L are diagrams for explaining an example of identifying the marker type using the area ratio, the ratio of the size of the region of the marker. FIGS. 23A through 23L each show an example of the marker with the multiplicity of 3. For example, the three markers shown in FIGS. 23D, 23H, and 23L have the same size, but are different in size of the region area of each label. Therefore, the markers shown in FIGS. 23D, 23H, and 23L can be distinguished by comparing the area between the regions. Similarly, in other markers, it is possible to identify each of the markers by comparing the ratio of the area between the regions or the ratio of the size between the regions.

Then, the marker processing method according to the second embodiment will be explained using the flowchart shown in FIG. 20. It should be noted that the explanation of the operations the same as those of the first embodiment will be omitted. In FIG. 20, the process of the steps S201 through S207 is the same as the process of the steps S1 (steps S101 through S105) through S14 of the first embodiment.

Then, to the marker type identification section 201, there are input the marker information thus determined from the marker determination section 107 and the region labeling information from the region labeling section 104. Further, the marker type identification section 201 identifies the marker (a marker type identification process: step S208) based on at least one of the multiplicity of the marker, the area ratio between the regions of the marker, and the ratio of the size between the regions of the marker using the received marker information determined by the marker determination section 107, and the received region labeling information labeled by the region labeling section 104.

Subsequently, the marker type identification section 201 outputs (a marker position/type output process: step S209) the marker information (the centroid coordinate of the marker, the label number constituting the marker, the multiplicity, and the marker type) thus identified to the marker position/type output section 202.

According to the process described above, the marker process according to the second embodiment is terminated.

As described above, according to the second embodiment, the binarization section 102 binarizes the shot image, the region labeling section 104 performs the labeling on the image information thus binarized, and then the region centroid obtaining section 105 obtains the centroid of each of the regions thus labeled. Subsequently, the region centroid multiplicity obtaining section 106 compares the centroids of the regions having the respective labels thus obtained to thereby obtain the multiplicity representing how the centroids overlap with each other. Further, the marker determination section 107 performs the marker determination based on whether or not the multiplicity thus obtained is equal to or larger than a predetermined value. Further, the marker type identification section 201 identifies the marker using the information generated by the region labeling section 104 in the labeling process, the multiplicity obtained by the region centroid multiplicity obtaining section 106, and the marker information determined by the marker determination section 107.

Further, according to the second embodiment, since the centroids of the regions as the marker or the information as a plane is used, it is expected that the noise component is reduced or averaged by integration, and therefore, the noise resistance higher than that of the marker and the marker processing method of the related art can be achieved.

As described above, according to the second embodiment, since it is arranged to identify the marker based on the multiplicity of the centroid (the center of figure can also be adopted) of the marker, the area ratio between the regions of the marker, or the ratio of the size between the regions, it becomes possible to provide the marker or to perform the marker process independent of the posture (position, rotation, and tilt) of the marker, and of the size of the marker, and further having sufficient resistance properties to the noise in the shot image.

Third Embodiment

Then, a third embodiment will be explained with reference to FIGS. 24 through 27. The third embodiment relates to a method of forming the marker embedded with additional information. As explained with reference to FIGS. 17A through 17F of the first embodiment, since the only requirement of the marker, the marker processing method, and the marker processing device of the invention is that a predetermined number of centroids of the regions (labels) of the element overlap with each other, if a redundant element is embedded in a space other than the region, substantially the same advantage can be obtained.

Figure 24:
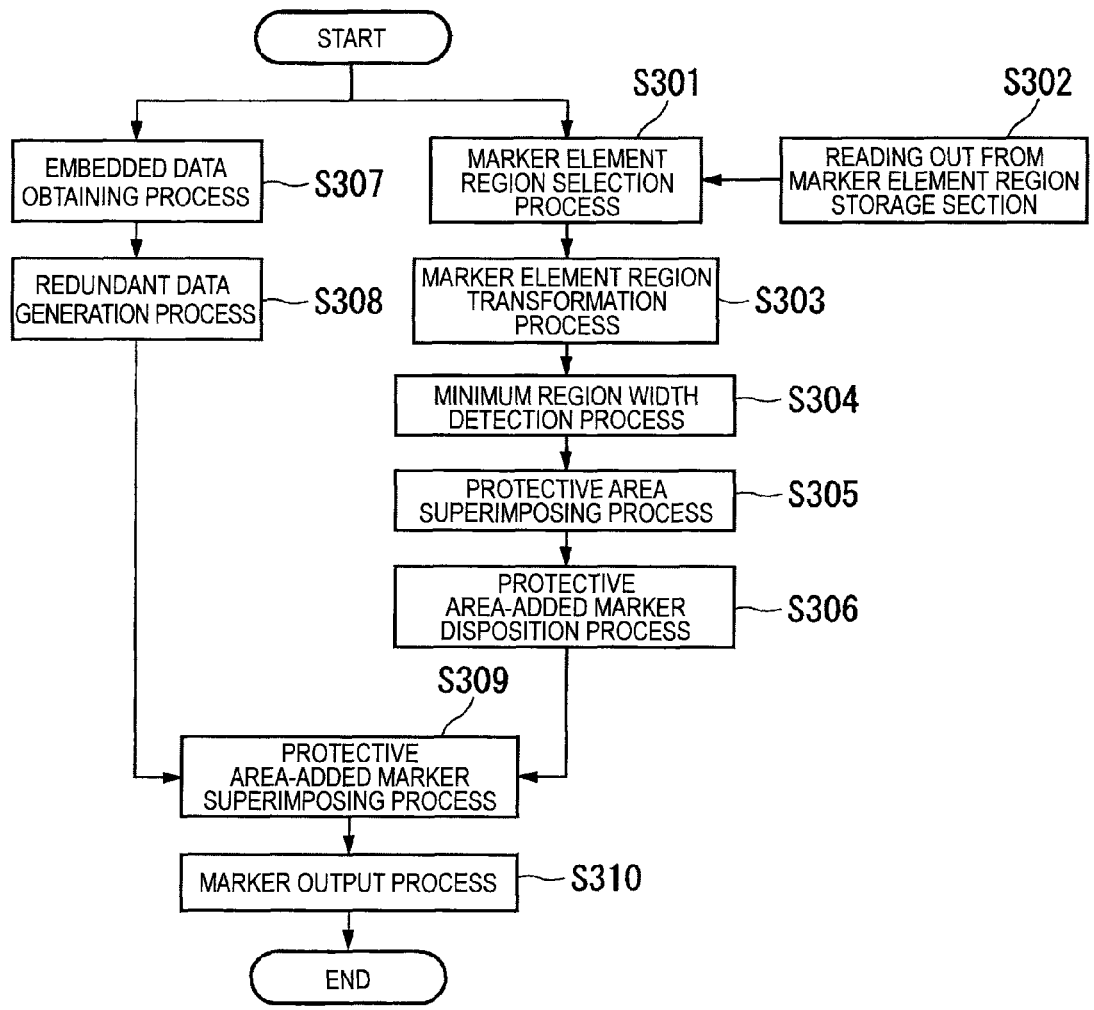
FIG. 24 is a flowchart of a process of embedding additional information in the marker according to a third embodiment of the invention.
Figure 25:
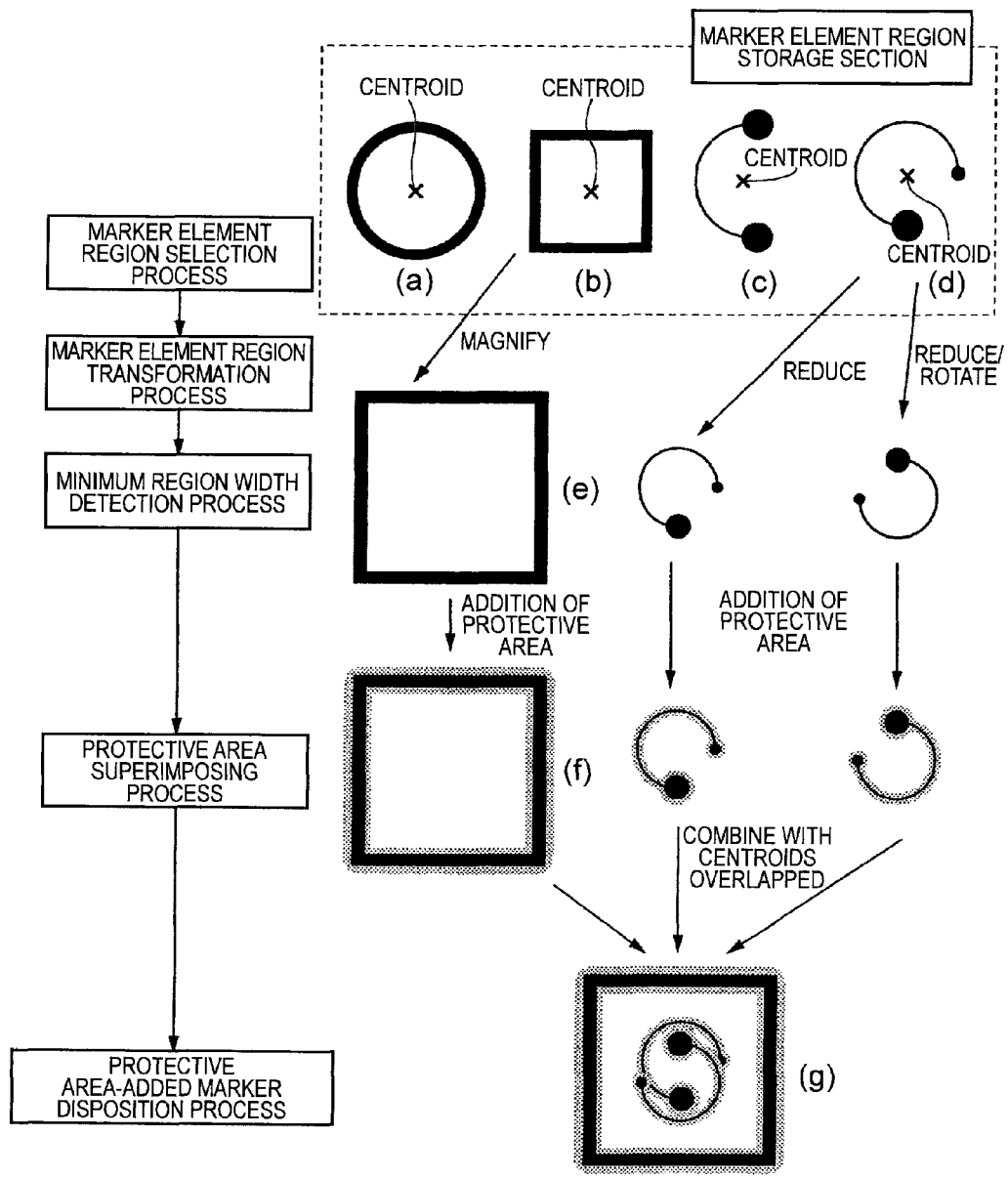
FIG. 25 is a diagram for explaining a method of creating a marker attached with a protective region according to the third embodiment.
Figure 26:
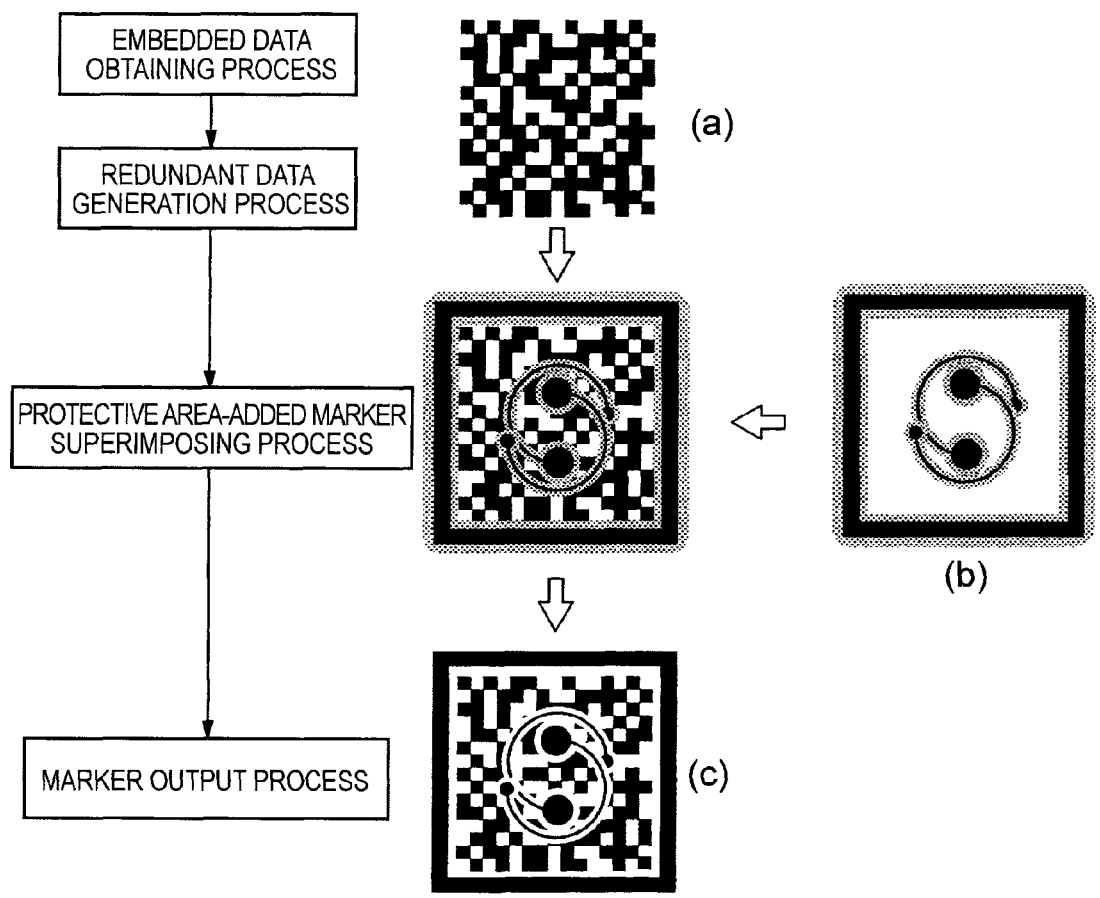
FIG. 26 is a diagram for explaining a method of attaching data to the marker according to the third embodiment.
Figure 27:
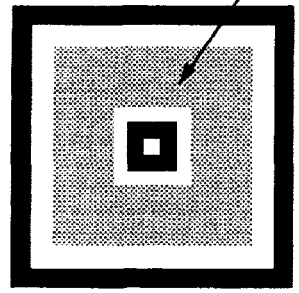
FIGS. 27A through 27E are diagrams showing examples of a region of the marker according to the third embodiment, where the additional data can be embedded, and examples of actually embedding the additional data.
Figure 27:
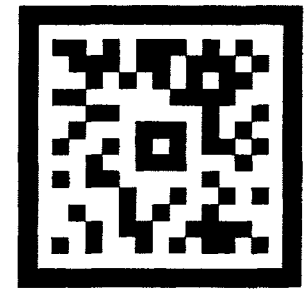
Figure 27:
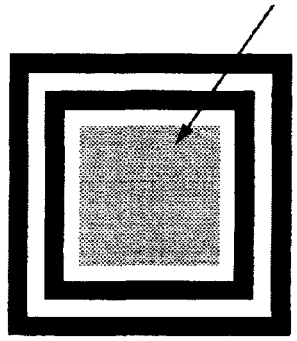
Figure 27:
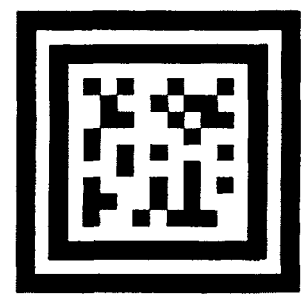
Figure 27:
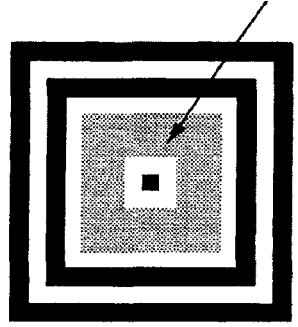
Figure 28:
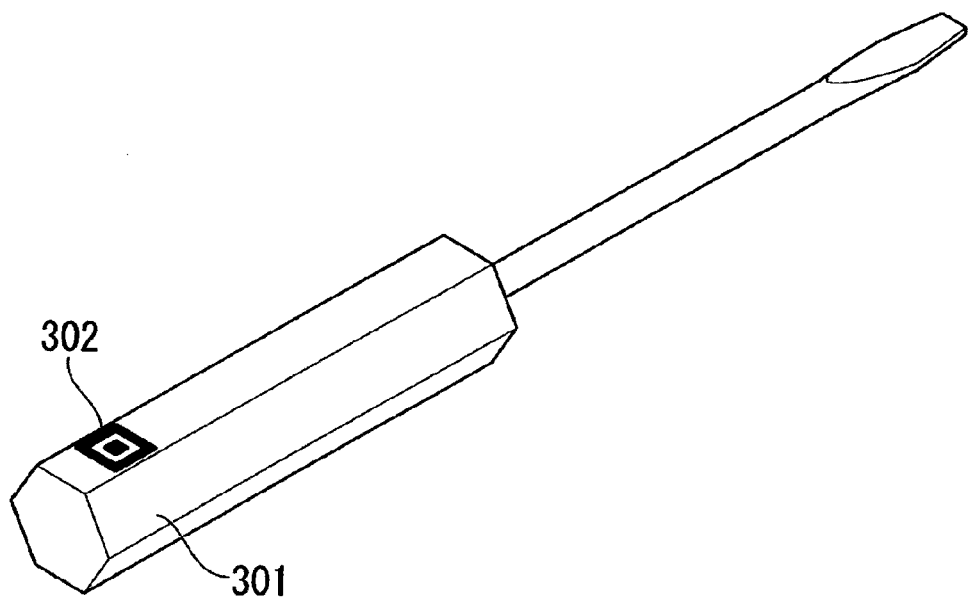
FIGS. 28A and 28B are diagrams showing some examples of an object having the marker according to a fourth embodiment of the invention.
Figure 28:
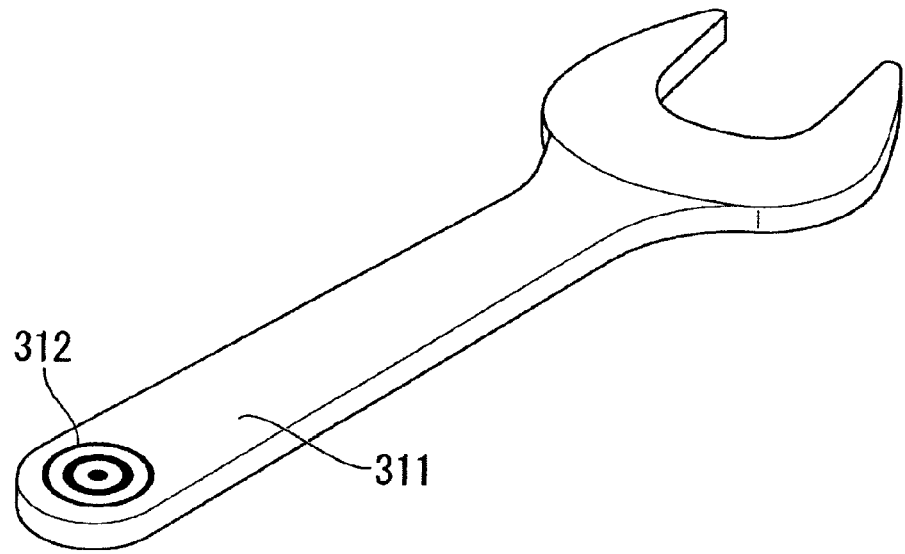

An example of a method of embedding the redundant information into the marker will be explained with reference to FIGS. 24 through 27. FIG. 24 shows a flowchart of a process of embedding additional information into the marker. FIG. 25 is a diagram for explaining a method of forming a protective area-added marker. FIG. 26 is a diagram for explaining a method of adding data to the marker. The process of forming a marker, and of embedding additional information into the marker is performed by, for example, a computer, and is specifically executed along a program stored in a storage device such as a read only memory (ROM) connected to a central processing unit (CPU), a hard disk drive (HDD), or a USB memory connected via the universal serial bus (USB) I/F.

Firstly, in FIGS. 24 and 25, marker element regions are readout (step S301) from the marker element region storage section.

Then, the marker element regions used for marker formation are selected (a marker element region selection process: step S302) in the marker element regions thus read out from the marker element region storage section. The marker element regions are selected by the computer for performing the marker formation in a random manner, or based on a predetermined selection criterion, and for example, the marker element regions denoted by (b) and (d) in FIG. 25 are selected.

Subsequently, as indicated by (e) in FIG. 25, at least one of a magnification process, a reduction process, and a rotation process is performed (a marker element region transformation process: step S303) alone or in combination with respect to the marker element regions thus elected if necessary. For example, in FIG. 25, the transformation process by magnification is performed on the selected element region (b), and the transformation process by reduction, and reduction and rotation is performed on the selected marker element region (d). Further, it is also possible to set the marker and the protective area of the marker so that the size of the marker region becomes the range in which the correction of the missing data in the additional information to be embedded such as a two-dimensional code is possible. The protective area of the marker denotes the area in which the image to be embedded is not disposed.

Subsequently, detection of the minimum region width is performed (a minimum region width detection process: step S304) with respect to each of the marker element regions transformed in the step S303. This is a guard for separating the marker element from the additional information thus embedded and for protecting the marker element when embedding the additional information into the marker element region, and the minimum region width is a region width set based on, for example, the resolution of the camera 120, the resolution of the printer used when printing the marker, and the size of the marker intended to be formed, and so on.

Subsequently, as indicated by (f) in FIG. 25, the minimum region width detected in the step S304 is overlapped (a protective area overlapping process: S305) on each of the marker element regions transformed in the step S303.

Subsequently, as indicated by (g) in FIG. 25, the marker element regions on which the protective area is overlapped in the step S305 are combined so that the coordinates of the centroids (the center of figure can also be adopted) are substantially equal to each other to dispose the protective area-added marker (a protective area-added marker disposition process: step S306).

Subsequently, in FIGS. 24, 26, the data to be embedded into the marker is obtained (an embedded data obtaining process: step S307). The data to be embedded can be arranged to be obtained by reading out the data stored in the storage device such as a ROM, an HDD, or a USB memory connected via the USB I/F, or obtained via a USB memory or a network.

Subsequently, as shown in the part (a) of FIG. 26, the redundant data is generated (a redundant data generation process: step S308) using the embedded data obtained in the step S307. As a redundant data generation method, for example, a predetermined method such as a generation method of a typical two-dimensional code is used.

Subsequently, the redundant data generated in the step S308 is superimposed into the protective area-added marker disposed in the step S306 to thereby form (a protective area-added marker superimposing process: step S309) the marker embedded with the redundant data. Specifically, the redundant data shown in the part (a) of FIG. 26 is superimposed into the protective area-added marker shown in the part (b) of FIG. 26 (the same as (g) in FIG. 25), thereby forming the marker shown in the part (c) of FIG. 26 embedded with the redundant data.

Subsequently, the protective area is removed from the marker formed in the step S308 embedded with the redundant data to thereby perform the marker formation, and then, the marker thus formed is output (a marker output process: step S310) to the storage device such as a ROM, an HDD, or a USB memory connected via the USB I/F, or a printer connected to the computer.

According to the process described above, the formation of the marker embedded with the additional data is terminated.

Then, some examples of embedding additional data into the marker will be explained with reference to FIGS. 27A through 27E. FIGS. 27A through 27E are diagrams showing examples of an area of the marker where the additional data can be embedded, and examples of actually embedding the additional data. FIG. 27A is a diagram showing an example of the marker with the multiplicity of 3, and FIG. 27B is a diagram showing an example of embedding the additional data into the marker shown in FIG. 27A. Similarly, FIG. 27C is a diagram showing an example of the marker with the multiplicity of 3, and FIG. 27D is a diagram showing an example of embedding the additional data into the marker shown in FIG. 27C. FIG. 27E shows the marker with the multiplicity of 4, and shows an example of a range for arbitrary data as the additional data.

As described above, according to the third embodiment, since it is arranged that the protective area is provided to the marker to be formed to thereby superimpose the additional data, it becomes possible to embed the additional data into the marker within the range where the additional data can be disposed so as not to affect the marker detection process. As described above, in the case of using the marker processing method and the marker according to the invention, a variety of markers can be formed as described in the first and second embodiments, and moreover, it is also possible to embed additional information using the method described in the third embodiment, which provides a wide application range and a wide range of practical use.

Further, according to the third embodiment, it is possible to form a marker having a figure representing the additional data disposed so as to surround the constituents of the marker.

It should be noted that although in the third embodiment the method of forming the marker and embedding the additional information into the marker using the computer is explained, the formation of the marker and the embedding of the additional information into the marker can also be performed by a marker formation device provided with a function of performing the process shown in FIGS. 24 through 26.

Fourth Embodiment

Then, a fourth embodiment will be explained with reference to FIGS. 28A and 28B. The fourth embodiment relates to an object having the marker formed by the method according to the third embodiment. FIGS. 28A and 28B are diagrams showing examples of the object having the marker according to the present embodiment. FIG. 28A is a diagram of an example of attaching a marker 302 to a screwdriver 301, and FIG. 28B is a diagram of an example of attaching a marker 312 to a spanner 311. The markers provided to the objects can have the multiplicities different from each other, and the different ratios of the size between the regions or the different area ratios of the regions as described in the second embodiment. Further, by correlating the markers 302, 312 with the screwdriver 301 and the spanner 311, respectively, and then previously registering them in the marker processing device, the objects can be identified by performing the identification of the marker.

The identification of the markers is performed using the method of the first embodiment, in which the multiplicity of all of the combinations of the labeled regions is obtained, and further, whether or not the combination is the marker is determined. Further, according to the method of the second embodiment, the identification of the markers is performed based on the ratio of the size between the regions or the area ratio between the regions. Further, even in the case in which a plurality of objects provided with the marker exists in the shot image, and further, the markers are rotated or scaled due to the arrangement of the objects as shown in FIG. 5, the identification can be performed with accuracy. Further, the markers 302, 312 can be bonded to the objects 301, 311, or printed on the objects, or formed thereon when manufacturing the objects using a metal mold.

As described above, according to the fourth embodiment, since it is arranged that the markers formed by the method of the third embodiment are provided to the objects, and the markers are identified by the methods of the first embodiment and the second embodiment, it is possible to provide an object having a marker, which is independent of the posture and the size of the marker, highly resistant to the noise in the image, and allowing reduction of an amount of processing for marker detection by using a monochrome image instead of hue information.

Fifth Embodiment

Figure 29:
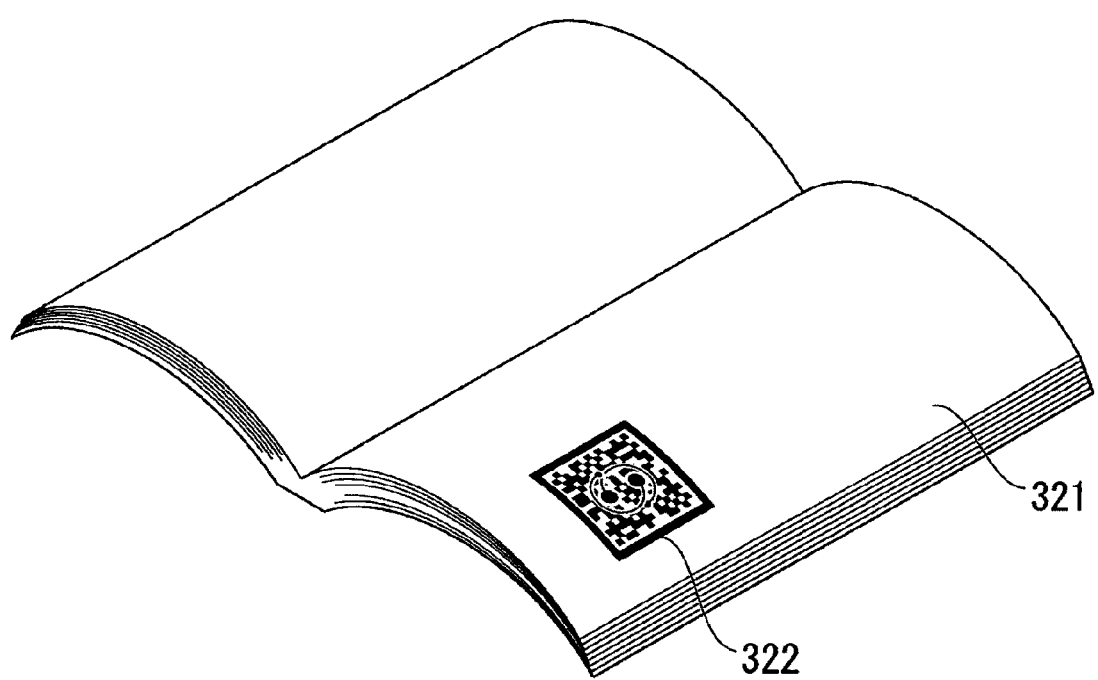
FIG. 29 is a diagram showing an example of an object having the marker according to a fifth embodiment of the invention.

Then, a fifth embodiment will be explained with reference to FIG. 29. The fifth embodiment relates to another specific example of an object provided with a marker. FIG. 29 is a diagram showing an example of the object having the marker according to the present embodiment. In FIG. 29, the object (e.g., a book or a magazine) 321 has the marker 322 printed in a page thereof. The marker 322 is formed according to the third embodiment, and is embedded with additional information. The marker processing device is previously registered with a uniform resource locator (url) address or the like on the internet in which the item or the advertisement related to the page attached with the marker is posted. Then the marker processing device obtains the multiplicity of all of the combinations of the labeled regions, and further, determines whether or not the combination is the marker using the method of the first embodiment. Further, according to the method of the second embodiment, the identification of the markers is performed based on the ratio of the size between the regions or the area ratio between the regions. Further, the marker processing device reads the two-dimensional code, and then accesses the url address or the like corresponding to the two-dimensional code thus read, and thus displays the item or the advertisement related to the information added thereto.

It should be noted that although the case of embedding the additional information is explained as an example of the marker attached to the object 321, in the case in which a plurality of url addresses or the like on the Internet different from each other for every marker is registered in the marker processing device while being correlated with the respective markers, the additional information can be eliminated from the marker attached to the page. Further, the information to be correlated with the marker or the additional information embedded into the marker is not limited to the url address, but can be other information, such as image or character information directly correlated therewith.

As described above, according to the fifth embodiment, since the marker formed by the method of the third embodiment is attached to the object, the marker is identified by the methods of the first and second embodiments, the url address or the like is registered to the marker processing device in advance while being correlated with the marker attached to the object or the additional information embedded into the marker, and information is read out based on the information thus registered and correlated with the marker or the additional information embedded into the marker, and then displayed, it is possible to provide an object having a marker, which is independent of the posture and the size of the marker, highly resistant to the noise in the image, and allowing reduction of an amount of processing for marker detection by using a monochrome image instead of hue information.

Further, although in the first through fifth embodiments the example of using a monochrome pattern as a marker is explained, the shot image can be a grayscale image within a range in which the contrast equivalent to the monochrome pattern can be obtained, or a combination of hues.

Further, although in the first through fifth embodiments the example of using circles, rectangles, lines, and so on as the marker is explained, this is not a limitation, but polygons, figures surrounded by curves, and so on can also be adopted providing those figures each provided with the area and the centroid as a region, and the centroid coordinates thereof fall within a predetermined tolerance.

It should be noted that it is also possible to execute a part of or the whole functions shown in FIG. 4 of the first embodiment and FIG. 19 of the second embodiment in accordance with a program stored in the storage device such as a ROM, an HDD, connected to the CPU not shown of the marker processing device, or a USB memory connected via the USB I/F.

The entire disclosure of Japanese Patent Application Nos. 2009-179265, filed Jul. 31, 2009, 2010-064322, filed Mar. 19, 2010 and 2010-149715, filed Jun. 30, 2010 are expressly incorporated by reference herein.

What is claimed is:

1. A marker processing method comprising:
   (a) binarizing an image including a marker to generate a binarized image;
   (b) labeling one or more constituents of the image based on the binarized image to generate labeled constituents;
   (c) obtaining a region centroid of each of the labeled constituents;
   (d) obtaining a degree of overlap of the region centroids of the labeled constituents; and
   (e) detecting the marker based on the degree of overlap of the region centroids, wherein the marker is detected if the degree of overlap of the region centroids is one of equal to and larger than 3.

2. The marker processing method according to claim 1, further comprising:
   (f) identifying a type of the marker detected in step (e) using at least one of the degree of overlap of the region centroids obtained in step (d), an area ratio between the labeled constituents of the marker, and a size ratio between the labeled constituents of the marker.

3. The marker processing method according to claim 1, wherein the marker includes at least three of the constituents having a common centroid.

4. A marker processing device comprising:
   a binarization section that binarizes an image including a marker to generate a binarized image;
   a labeling section that detects one or more constituents of the image based on the binarized image and that labels the constituents to generate labeled constituents;
   a region centroid obtaining section that obtains a region centroid of each of the labeled constituents;
   a region centroid multiplicity obtaining section that obtains a degree of overlap of the region centroids of the labeled constituents; and
   a marker determination section that detects a marker based on the degree of overlap of the regions centroids, wherein the marker is detected if the degree of overlap of the regions centroids is one of equal to and larger than 3.

* * * * *